United States Patent [19]
Yoshida et al.

[11] Patent Number: 5,217,643
[45] Date of Patent: Jun. 8, 1993

[54] LIQUID CRYSTAL COMPOSITION, LIQUID CRYSTAL DEVICE, DISPLAY APPARATUS AND DISPLAY METHOD USING SAME

[75] Inventors: Akio Yoshida, Hiratsuka; Takeshi Togano, Yokohama; Junko Sato, Hiratsuka, all of Japan

[73] Assignee: Canon Kabushiki Kaisha, Tokyo, Japan

[21] Appl. No.: 653,233

[22] Filed: Feb. 11, 1991

[30] Foreign Application Priority Data

Feb. 15, 1990 [JP] Japan .................. 2-035233
Feb. 15, 1990 [JP] Japan .................. 2-035234
Feb. 15, 1990 [JP] Japan .................. 2-035235
Jan. 31, 1991 [JP] Japan .................. 3-011000

[51] Int. Cl.$^5$ ............ C09K 19/58; C09K 19/52; C09K 19/54; C09K 19/30
[52] U.S. Cl. ............... 252/299.2; 252/299.01; 252/299.5; 252/299.6; 252/299.63
[58] Field of Search ............ 252/299.01, 299.5, 299.2, 252/299.63, 299.6; 359/103

[56] References Cited

U.S. PATENT DOCUMENTS

| | | | |
|---|---|---|---|
| 3,966,631 | 6/1976 | Toriyama et al. | 252/299.61 X |
| 4,033,905 | 7/1977 | Bloom et al. | 252/500 |
| 4,091,847 | 5/1978 | Sorkin | 350/350 R X |
| 4,256,656 | 3/1981 | Beguin et al. | 558/416 X |
| 4,909,598 | 3/1990 | Ninomiya et al. | 350/96.34 |
| 4,960,539 | 10/1990 | Kuhn et al. | 252/299.5 |
| 4,983,318 | 1/1991 | Matsumoto et al. | 252/299.01 |

FOREIGN PATENT DOCUMENTS

| | | |
|---|---|---|
| 0011002 | 5/1980 | European Pat. Off. |
| 0087963 | 9/1983 | European Pat. Off. |
| 2503703 | 10/1982 | France |
| 63-135922 | 6/1988 | Japan |
| 1-078235 | 3/1989 | Japan |
| 1090413 | 4/1989 | Japan |
| 0002161 | 3/1990 | PCT Int'l Appl. |
| 2094311 | 9/1982 | United Kingdom |

*Primary Examiner*—Robert L. Stoll
*Assistant Examiner*—C. Harris
*Attorney, Agent, or Firm*—Fitzpatrick, Cella, Harper & Scinto

[57] ABSTRACT

A mesomorphic liquid crystal composition stably exhibits lowered resistivity for quickly attenuating a reverse voltage caused by charge localization.

45 Claims, 6 Drawing Sheets

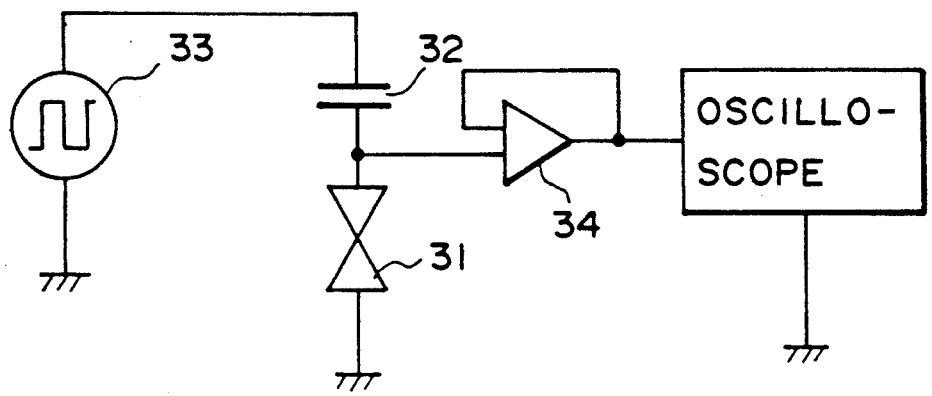
F I G. 3A
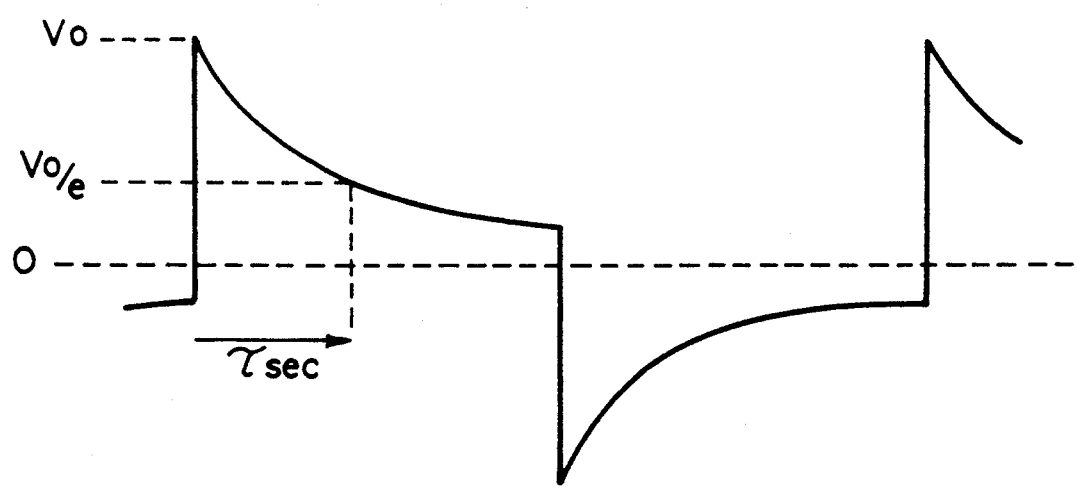
F I G. 3B

LIQUID CRYSTAL COMPOSITION, LIQUID CRYSTAL DEVICE, DISPLAY APPARATUS AND DISPLAY METHOD USING SAME

FIELD OF THE INVENTION AND RELATED ART

The present invention relates to a liquid crystal composition, a liquid crystal device, a display apparatus and a display method, and particularly to a liquid crystal composition containing a specific resistivity modifier improving display characteristics, a liquid crystal device using the composition, a display apparatus using the device, and a display method using the composition, device and apparatus.

Hitherto, in electro-optical devices utilizing liquid crystal devices comprising nematic liquid crystals, there have been made several proposals for providing improved display characteristics by decreasing an electric resistance or resistivity of a liquid crystal layer. Representative examples of such liquid crystal devices include a dynamic scattering (DS) mode liquid crystal device and a twisted nematic (TN) mode liquid crystal device.

The DS mode liquid crystal device required lowering the resistivity of its liquid crystal layer because there occur difficulties such that incident light is not scattered and that a threshold voltage for driving the device is increased if the resistivity of the liquid crystal layer remains at a high level.

Most liquid crystal materials used for the DS mode liquid crystal device generally comprise liquid crystal having a negative dielectric anisotropy ($-\Delta\epsilon$) (hereinafter, referred to as "N-type liquid crystal" and containing no functional groups such as a cyano group showing a large electron attractive characteristic in liquid crystal molecules in many cases. On the other hand, in case of liquid crystals having a positive dielectric anisotropy ($+\Delta\epsilon$) (hereinafter, referred to as "P-type liquid crystal") and containing a cyano group in the terminal position of its liquid crystal molecule, the resistivity can be lowered easily by only adding a small amount of quaternary ammonium salts such as tetrabutylammonium bromide ($[CH_3(CH_2)_3]_4N^+.Br^-$, abbreviated as TBAB). However, it is not easy to lower the resistivity in the N-type liquid crystal. This is possibly because decrease in the resistivity in the P-type liquid crystal results from not only electrolytic dissociation of TBAB but also complex formation between TBAB and a cyano group due to interaction therebetween. Accordingly, a method of easily lowering the resistivity in the N-type liquid crystal has been desired.

As the TN mode liquid crystal device, liquid crystal materials having high resistivities have generally been used. In the TN mode liquid crystal device, a DC (direct current) voltage can be applied to the device because of abnormality in a power supply switch in some cases. The DC voltage does not disappear easily, so that a non-display state can continue for several tens of seconds. The duration of the non-display state can be shortened by lowering the resistivity of the liquid crystal layer in the TN mode liquid crystal device. For this purpose, a small amount of TBAB as described above can be added to the TN mode liquid crystal. However, TBAB has poor electrochemical stability in a long time, whereby the resistivity once lowered is gradually increased to a high level, thus leading to disadvantages, such as a change in threshold characteristic of the liquid crystal.

A ferroelectric liquid crystal device comprising a liquid crystal showing a chiral smectic phase and ferroelectricity has a peculiar problem as described hereinbelow.

In the conventional ferroelectric liquid crystal device (so-called SSFLCD (Surface Stabilized Ferroelectric Liquid Crystal Device)) proposed by Clark and Largerwall, the dipole moments of liquid crystal molecules in the liquid crystal layer are all uniformly oriented in the direction corresponding to a black or white state, so that inbalance (upward or downward) of the spontaneous polarization (Ps) is caused as shown in FIG. 2. The presence of the spontaneous polarization is a necessary condition for a switching characteristic of the ferroelectric liquid crystal device, so that the imbalance of the spontaneous polarization is inevitable in the above-mentioned SSFLCD. We have already reported the presence of an internal electric field induced by the spontaneous polarization in the SSFLCD (Japanese Laid-Open Patent Application No. (JP-A) 63-135922). In JP-A 63-135922, it is described that the ion localization is caused by migration of ionic impurities in a liquid crystal layer in response to an electric field caused by polarization of liquid crystal molecules. As a result, in a memory state of the SSFLC cell, an electrically stable state is provided by forming a counter electric field due to the ion localization in reverse to the electric field given by the polarization of the liquid crystal molecule.

We have further proposed a general method of realizing bistability in the above-mentioned SSFLC cell wherein insulating layers are disposed on electrode plates as disclosed in JP-A 64-78235 by developing the above-mentioned consideration. More specifically, in the SSFLC cell having insulating layers, a counter electric field due to the above-mentioned ion localization is formed in the direction reverse to an electric field due to spontaneous polarizations Ps of liquid crystal molecules. When the direction of the spontaneous polarizations in such a state is reversed in an instant by voltage application from an external driving circuit, the ions cannot migrate quickly in response to the reversal so that the counter electric field described above remains in the cell to cause an unstable voltage.

We have called such an unstable voltage a "reverse voltage", which has been reported in 13-th Liquid Crystal Form (Preprint, p. 142, (1987)).

In JP-A 63-135922, the reverse voltage resulted from switching of an external electric field is decreased by lowering the resistivity of a liquid crystal layer. On the other hand, JP-A 64-78235 proposes a solution by controlling the values of spontaneous polarization Ps, capacitance Ci of the insulating layer, resistivity Ri of the insulating layer and capacitance $C_{LC}$ of the liquid crystal layer.

SUMMARY OF THE INVENTION

An object of the present invention is to provide a liquid crystal composition containing a resistivity modifier (compound) which can stably lower a resistivity ($R_{LC}$) of a liquid crystal layer with good reproducibility and durability.

Another object of the present invention is to provide a liquid crystal composition containing a resistivity modifier having good solubility in the composition in view of difficulty such that a salt such as tetrabutylammonium bromide (TBAB) generally has poor solubility in a liquid crystal to precipitate its crystal particularly at low temperatures.

According to the present invention, there is provided a liquid crystal composition containing at least one resistivity modifier compound represented by the following formulas (I) to (IV):

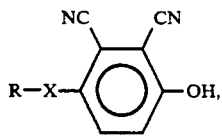 Formula (I)

wherein R denotes hydrogen, or a linear or branched alkyl group having 1-18 carbon atoms capable of having a substituent; and X denotes —O—,

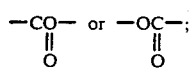

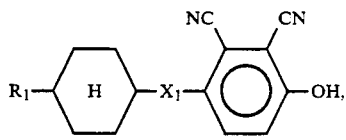 Formula (II)

wherein $R_1$ denotes a linear or branched alkyl or alkocy group having 1-18 carbon atoms capable of having a substituent; and $X_1$ denotes

or —CH$_2$O—:

Formula (III):

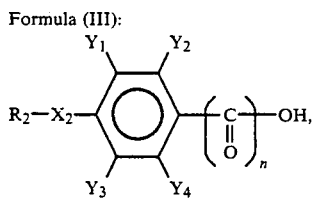

wherein $R_2$ denotes hydrogen, or a linear or branched alkyl group having 1-18 carbon atoms capable of having a substituent; $X_2$ denotes a single bond, —O—,

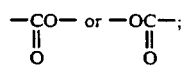

$Y_1$, $Y_2$, $Y_3$ and $Y_4$ respectively denote hydrogen, fluorine or —CF$_3$ with proviso that at least one of $Y_1$, $Y_2$, $Y_3$ and $Y_4$ is fluorine or —CF$_3$; and n is 0 or 1; and

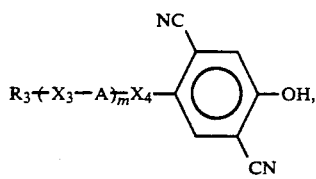 Formula (IV)

wherein $R_3$ denotes a linear or branched alkyl group having 1-18 carbon atoms capable of having a substituent; —A— denotes

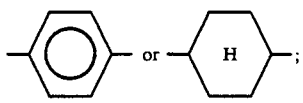

$X_3$ denotes —O—,

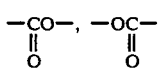

or a single bond, $X_4$ denotes —O—,

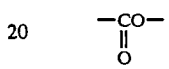

or —CH$_2$O—; and m is 0 or 1.

The present invention provides a liquid crystal device comprising a pair of electrode plates and the liquid crystal composition described above disposed between the electrode plates.

The present invention further provides a display apparatus comprising the liquid crystal device.

The present invention still further provides a display method using the liquid crystal composition, the liquid crystal device or the display apparatus.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3A is a measurement circuit diagram of the resistance ($R_{LC}$ of a liquid crystal layer;

FIG. 3B is a diagram showing decay of a cell voltage;

DETAILED DESCRIPTION OF THE INVENTION

Figure 1:
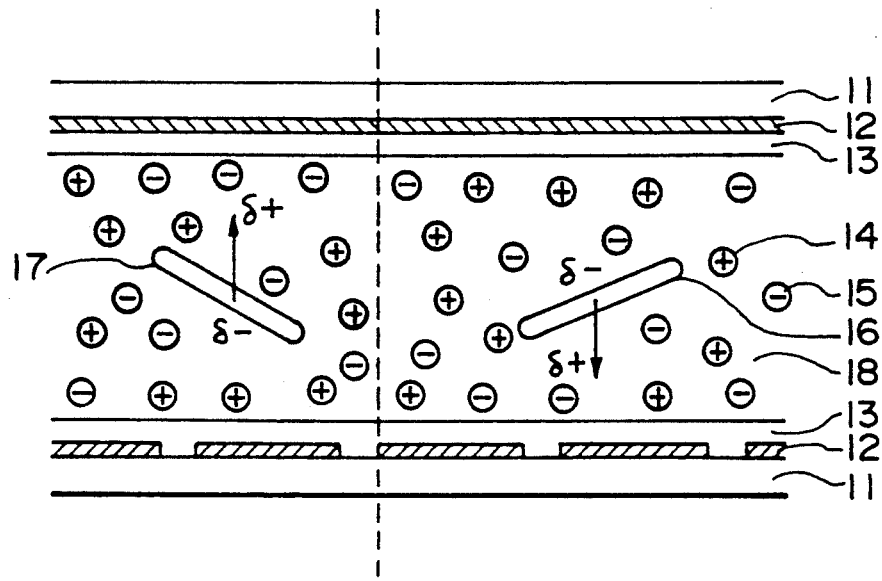
FIG. 1 is a schematic sectional view of an embodiment of a ferroelectric liquid crystal device using the liquid crystal composition according to the present invention.
Figure 2:
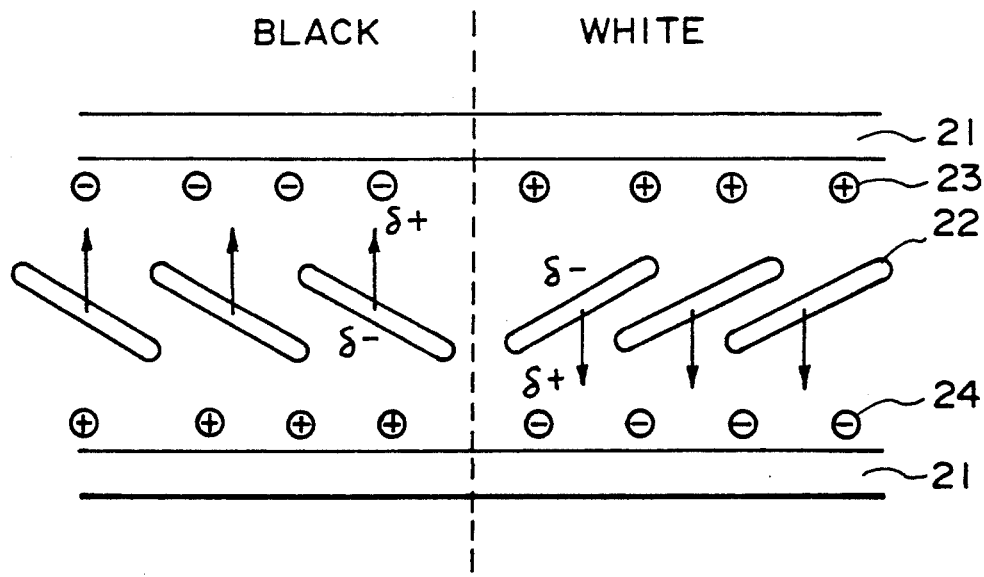
FIG. 2 is a schematic sectional view of a device cell embodiment for illustrating the operation principle of the conventional surface-stabilized ferroelectric liquid crystal device (SSFLCD) with a noticeable localization of ions.

The present invention has been accomplished as a further development of JP-A 63-135922 and minimizes a drawback to a display described below due to the above-mentioned reverse voltage caused by a spontaneous polarization.

More specifically, when the spontaneous polarization is large, switching can not effectively be conducted by means of an external electric field and the device does not satisfy fundamental characteristics. When the spontaneous polarization is small, bistability can be obtained but the reverse voltage functions like a DC bias to deteriorate image quality in the display.

When a picture element has been in a "black" state in a bistable FLC panel having a memory characteristic, ions in the liquid crystal layer are polarized so as to stabilize the state to form a counter electric field having the direction reverse to that of an electric field of the spontaneous polarization. Then, when a signal of "white" is given by an external driving circuit, the entire region of the picture element is changed into a "white" state in an instant. The above-mentioned reverse voltage occurs in this process, whereby a part of the picture element having a lower threshold voltage (e.g., a region around an electrode edge of the picture element or spacer beads) is gradually returned to an original "black" state. Though this phenomenon is caused again by scanning in the next frame, the region returned to the "black" state decreases according as the reverse voltage declines. The above-mentioned phenomenon consequently disappears when a stable ion polarization corresponding to the "white" state is established. A similar phenomenon occurs also in the change from a "white" state to a "black" state. This phenomenon is recognized by an observer as an after image of blurring black when the signal is changed from "black" into "white".

As described above, the reverse voltage in an FLC display is related with fundamental characteristics of a display panel and an image quality such as afterimage to affect display characteristics.

We have found that a resistivity of a liquid crystal layer of a nematic liquid crystal or a ferroelectric liquid crystal can be lowered stably and durably and the above problems can be solved by adding at least one resistivity modifier (compound) represented by the above formula (I) to (IV).

In the formula (I) described above, preferred examples of R may include the following groups (i) and (ii):

(i) an n-alkyl group having 1–18 carbon atoms, particularly 4–14 carbon atoms; and (ii)

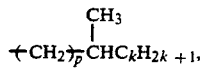

wherein p denotes an integer of 0–7 and k denotes an integer of 1–9 (optically active or inactive when k is 2 or above).

Further, X may preferably be —O— in the formula (I).

Specific examples of the resistivity modifier represented by the above-mentioned general formula (I) may include those denoted by the following structural formulas.

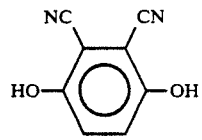 (1-1)

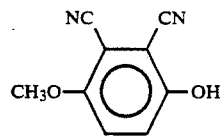 (1-2)

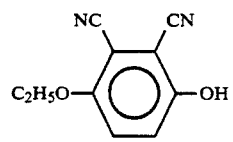 (1-3)

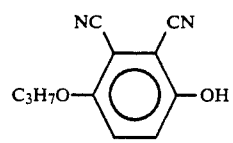 (1-4)

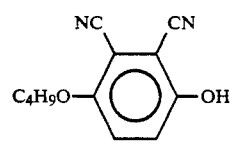 (1-5)

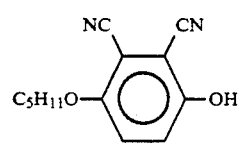 (1-6)

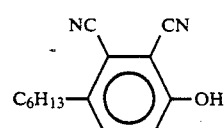 (1-7)

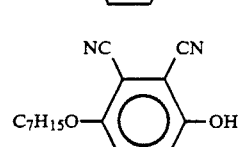 (1-8)

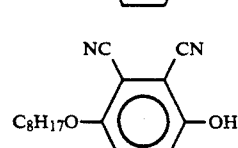 (1-9)

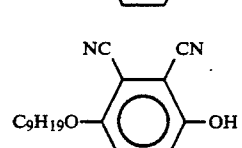 (1-10)

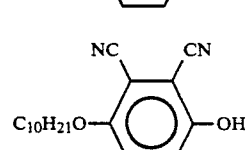 (1-11)

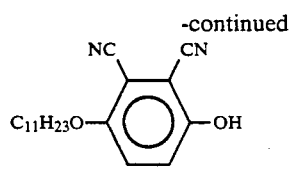 (1-12)
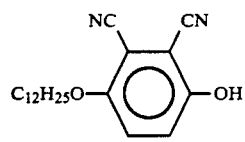 (1-13)
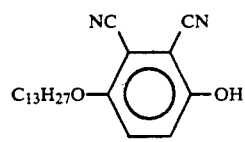 (1-14)
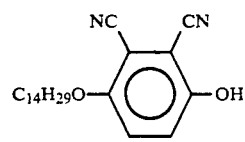 (1-15)
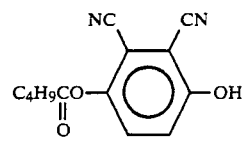 (1-16)
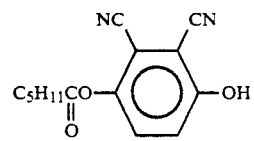 (1-17)
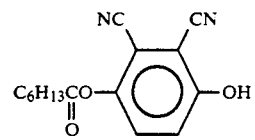 (1-18)
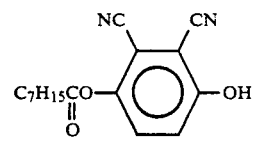 (1-19)
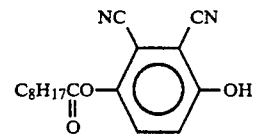 (1-20)
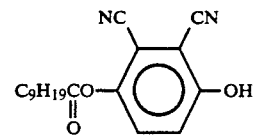 (1-21)
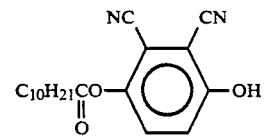 (1-22)
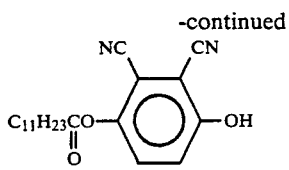 (1-23)
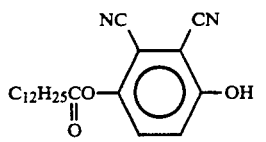 (1-24)
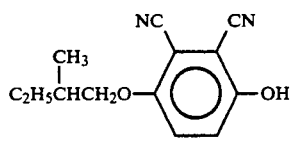 (1-25)
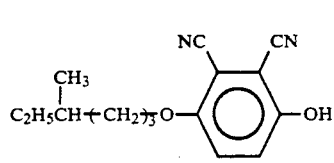 (1-26)
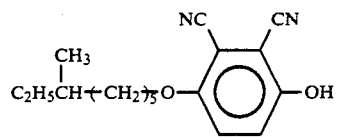 (1-27)
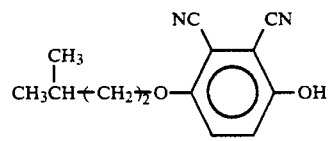 (1-28)
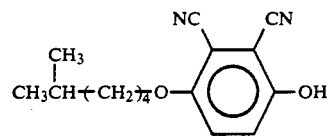 (1-29)
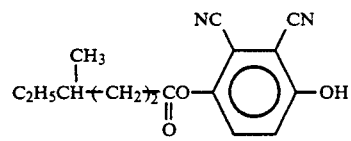 (1-30)
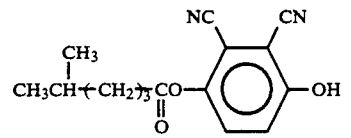 (1-31)
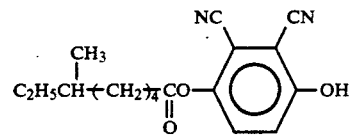 (1-32)
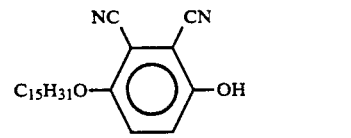 (1-33)

-continued

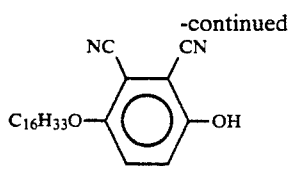 (1-34)

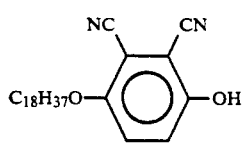 (1-35)

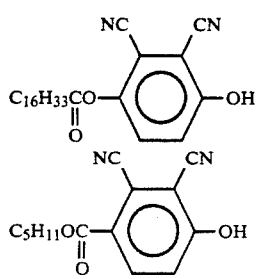 (1-36)

(1-37)

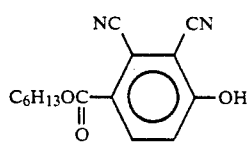 (1-38)

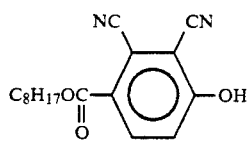 (1-39)

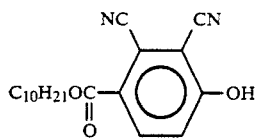 (1-40)

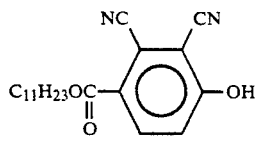 (1-41)

The resistivity modifier represented by the formula (I) may generally be synthesized through the following reaction schemes.

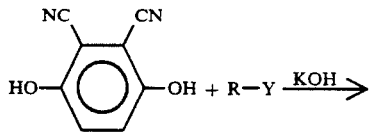

In the above, Y denotes —Br, —I or

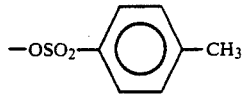

and R denotes the same as defined above.

(Case where X is —CO—)
                    ‖
                    O

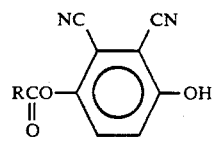

In the above, R denotes the same as defined above.

Synthesis Example 1

Production of 2,3-dicyano-4-hexyloxyphenol (Example Compound No. 1-7)

27 g (168.8 mM) of 2,3-dicyanohydroquinone and 22.2 g (337 mM) of 85%-potassium hydroxide were dissolved in a mixture solvent of 65 ml of methanol and 302 ml of dimethylformamide, followed by heating to 50° C. To the solution, 33.4 g (202.4 mM) of hexyl bromide were added dropwise in 25 minutes, followed by heating to 100° C. and stirring for 3 hours. The reaction mixture was poured into cold water and washed with ether. The water layer was acidified with 6N-hydrochloric acid to provide a pH value of 1, followed by precipitation of a crystal. The crystal was extracted with ether, and the ether layer was washed with 5%-sodium hydrogen-carbonate aqueous solution and further washed with water, followed by distilling-off of the solvent to obtain a crude product. The crude product was treated with activated carbon and recrystalized from methanol to obtain 13.1 g of 2,3-dicyano-4-hexyloxyphenol.

In the formula (II) described above, $R_1$ may preferably be an n-alkyl group having 1–18 carbon atoms, more preferably 3–14 carbon atoms.

Specific examples of the resistivity modifier represented by the formula (II) may include those denoted by the following structural formulas.

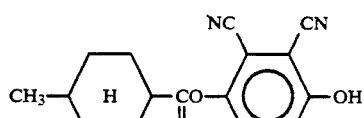 (2-1)

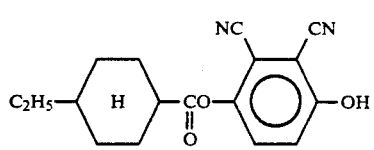 (2-2)

-continued
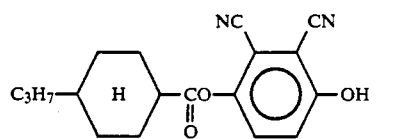 (2-3)
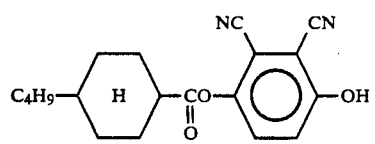 (2-4)
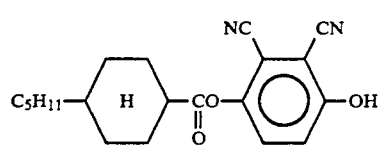 (2-5)
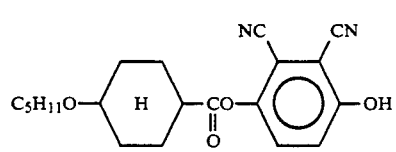 (2-6)
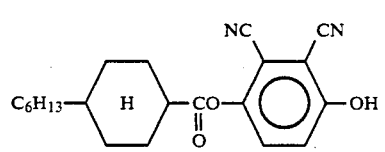 (2-7)
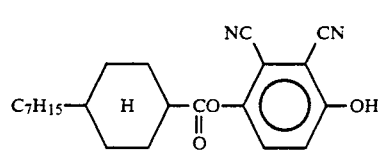 (2-8)
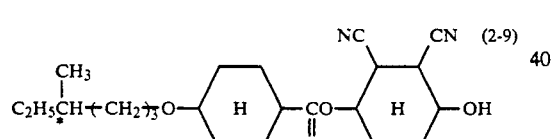 (2-9)
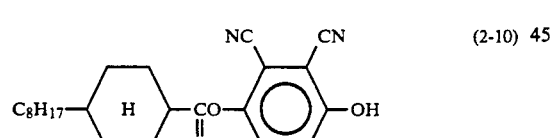 (2-10)
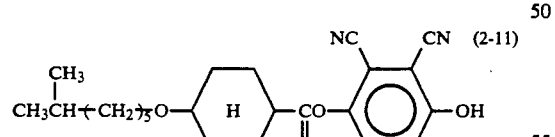 (2-11)
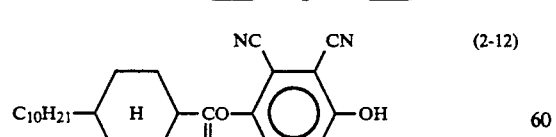 (2-12)
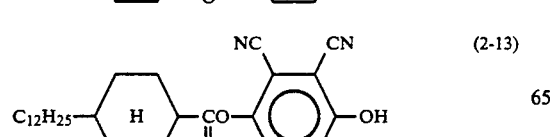 (2-13)
-continued
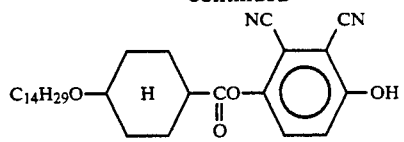 (2-14)
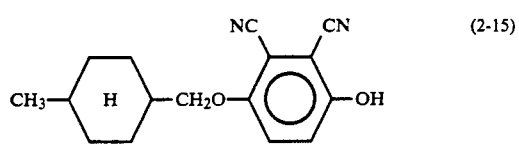 (2-15)
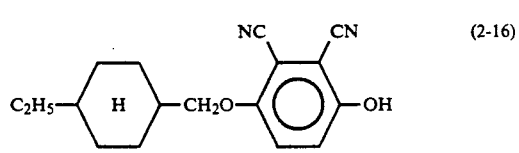 (2-16)
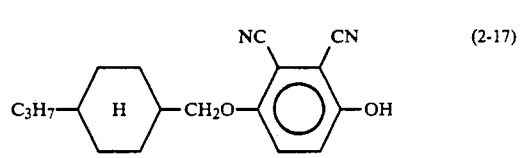 (2-17)
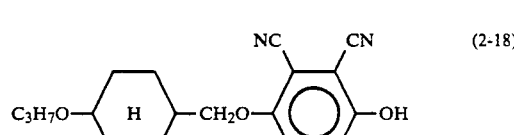 (2-18)
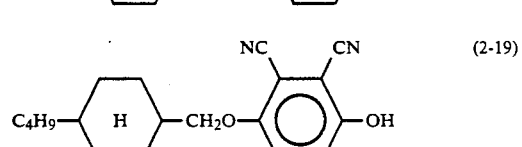 (2-19)
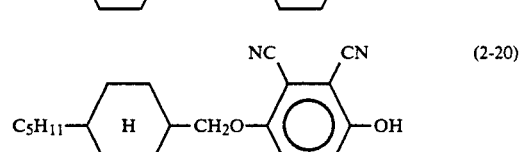 (2-20)
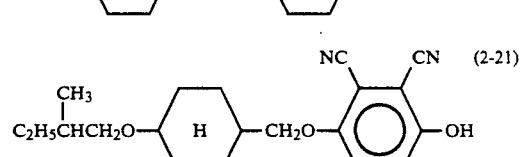 (2-21)
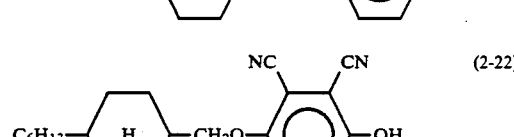 (2-22)
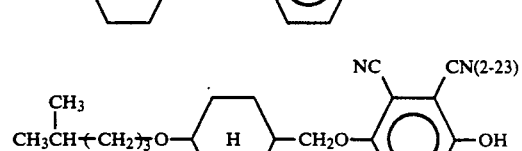 (2-23)
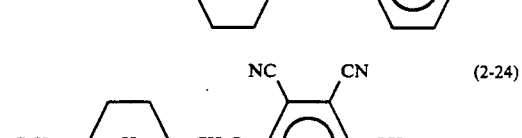 (2-24)

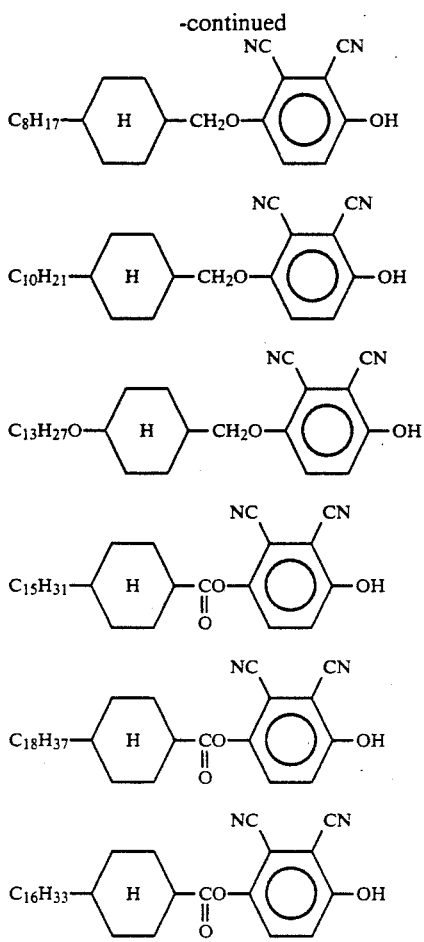

The resistivity modifier represented by the formula (II) may generally be synthesized through the following reaction schemes.

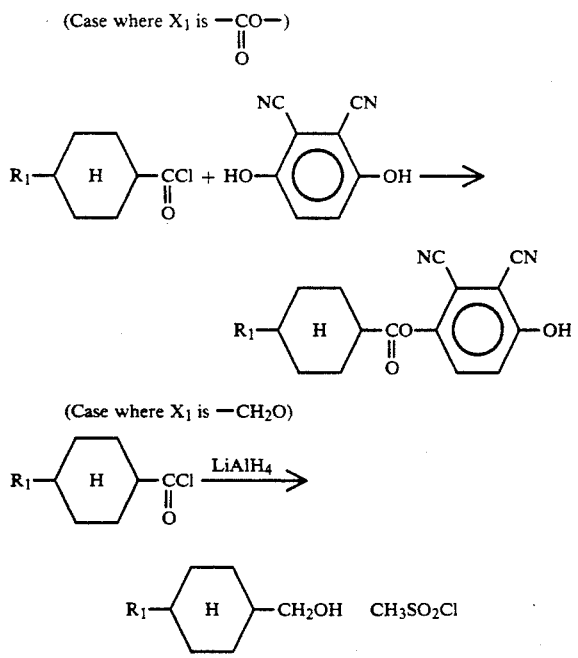

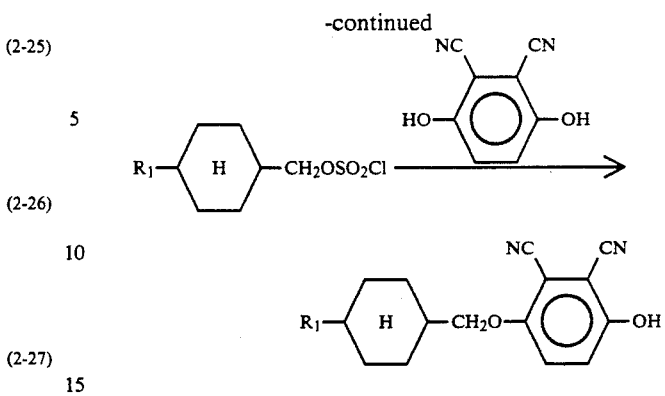

Synthesis Example 2

4-n-pentylcyclohexylmethyl 2,3-dicyano-4-hydroxyphenyl ether (Example Compound No. 2-20) was synthesized through the following steps i)–iii)

Step i)

To a dispersion of 1.75 g of aluminum lithium hydride in 40 ml of dry ether, a solution of 10 g of 4-n-pentylcyclohexanecarbonyl chloride in 12 ml of ether was added dropwise below 5° C., followed by stirring overnight at room temperature. After the reaction, the reaction mixture was acidified with 5%-hydrochloric acid aqueous solution until a pH value of 1 were shown and was subjected to extraction with ether. The organic layer was washed successively with water, 5%-sodium hydroxide, and water, followed by drying with anhydrous magnesium sulfate. The resultant organic layer was subjected to filtration, followed by distilling-off of the solvent to obtain 8.2 g of 4-n-pentylcyclohexylmethanol.

Step ii)

8.0 g of 4-n-pentylcyclohexylmethanol was dissolved in a mixture solvent of 8 ml of pyridine and 8 ml of toluene. To the solution, 6.0 g of methanesulfonyl chloride was added dropwise below 10° C., followed by stirring overnight at room temperature. After the reaction, the reaction mixture was poured into cold water and subjected to extraction with toluene, followed by washing successively with 5%-hydrochloric acid aqueous solution and water and drying with anhydrous magnesium sulfate. The resultant organic layer was subjected to filtration, followed by distilling-off of the solvent to obtain 11.3 g of 4-n-pentylcyclohexylmethyl methanesulfonate.

Step iii)

5.6 g of 2,3-dicyanohydroquinone and 4.6 g of 85%-potassium hydroxide were added to a mixture solvent of 15 ml of methanol and 60 ml of N,N-dimethylformamide, followed by heating to 50° C. to provide a solution. To the solution, 11.0 g of 4-n-pentylcyclohexylmethyl methanesulfonate was added, followed by stirring for 3 hours at 100° C. After the reaction, the reaction mixture was poured into cold water and washed with ether. The water layer was acidified with 6N-hydrochloric acid aqueous solution until a pH value of 1 was shown, and was subjected to extraction with ether. The organic layer was washed successively with 5%-sodium hydrogenecarbonate aqueous solution and water, followed by drying with anhydrous magnesium sulfate and distilling-off of the solvent to obtain a crude product. The crude product was purified by silica gel column chromatography (eluent: toluene/ethyl acetate) and treated with activated carbon, followed by recrystallization from methanol to obtain 3.6 g of 4-n-pentyl-cyclohexylmethyl 2,3-dicyano- 4-hydroxyphenyl ether.

In the formula (III) described above, $R_2$ may preferably be any one of hydrogen and the following groups (i) and (ii):

(i) an n-alkyl group having 1-18 carbon atoms, particularly 4-14 carbon atoms; and (ii)

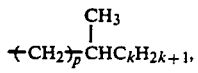

wherein p denotes an integer of 0-7 and k denotes an integer of 1-9 (optically active or inactive when k is 2 or above).

Further, $Y_1$, $Y_2$, $Y_3$ and $Y_4$ may preferably include the following combinations (iii) to (xi):

(iii) $Y_1 = Y_3 = Y_4 = H$ and $Y_2 = F$;
(iv) $Y_1 = F$ and $Y_2 = Y_3 = Y_4 = H$;
(v) $Y_1 = Y_3 = H$ and $Y_2 = Y_4 = F$;
(vi) $Y_1 = Y_3 = F$ and $Y_2 = Y_4 = H$;
(vii) $Y_1 = Y_4 = F$ and $Y_2 = Y_3 = H$;
(viii) $Y_1 = Y_2 = F$ and $Y_3 = Y_4 = H$;
(ix) $Y_1 = Y_2 = Y_3 = Y_4 = F$;
(x) $Y_1 = Y_3 = H$ and $Y_2 = Y_4 = CF_3$; and
(xi) $Y_1 = Y_3 = CF_3$ and $Y_2 = Y_4 = H$.

Specific examples of the resistivity modifier represented by the formula (III) may include those denoted by the following structural formulas.

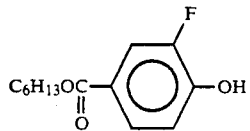 (3-1)

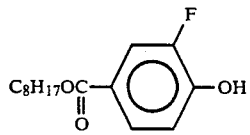 (3-2)

(3-3)

(3-4)

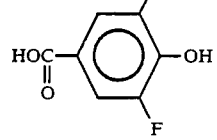 (3-5)

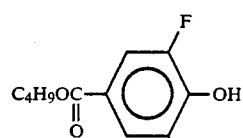 (3-6)

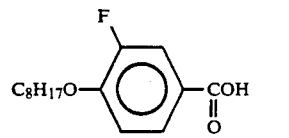 (3-7)

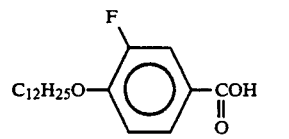 (3-8)

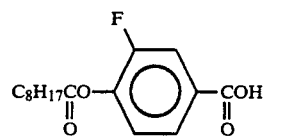 (3-9)

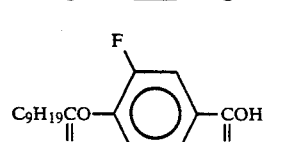 (3-10)

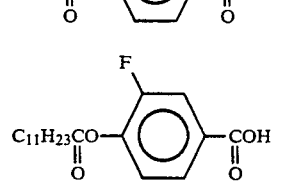 (3-11)

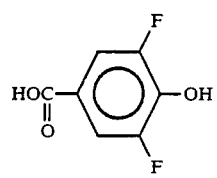 (3-12)

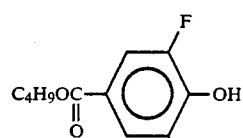 (3-13)

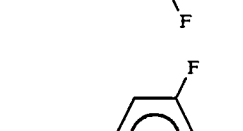 (3-14)

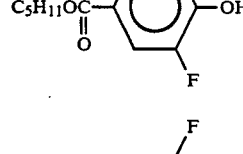 (3-15)

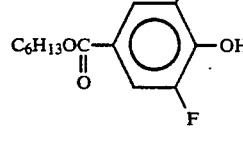 (3-16)

-continued
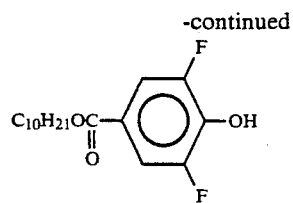 (3-17)
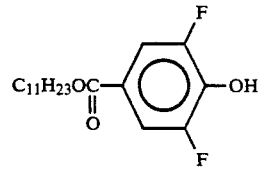 (3-18)
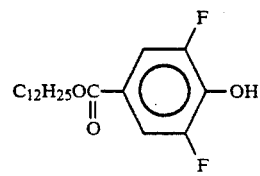 (3-19)
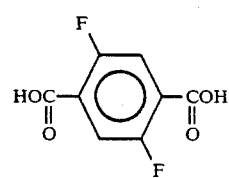 (3-20)
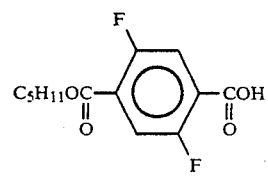 (3-21)
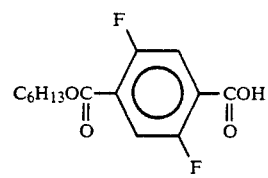 (3-22)
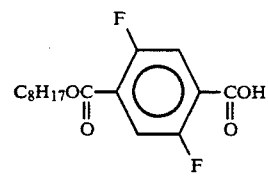 (3-23)
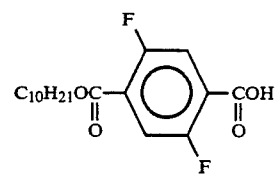 (3-24)
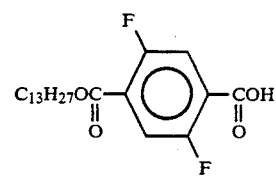 (3-25)
-continued
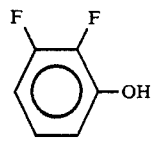 (3-26)
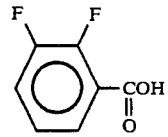 (3-27)
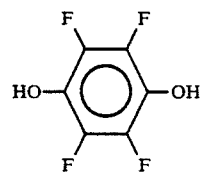 (3-28)
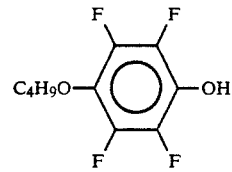 (3-29)
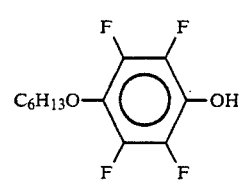 (3-30)
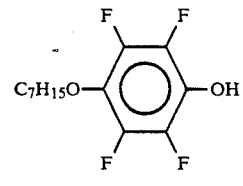 (3-31)
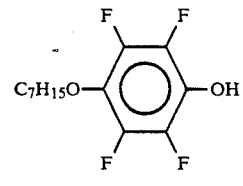 (3-32)
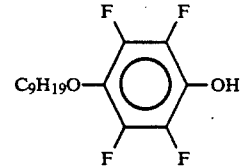 (3-33)
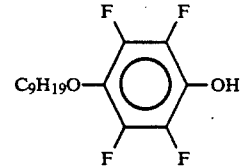 (3-34)

-continued
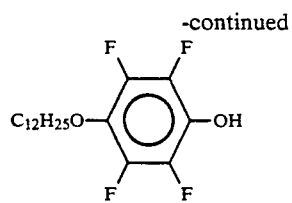 (3-35)
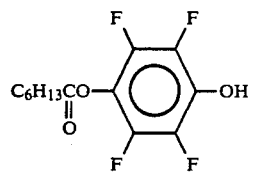 (3-36)
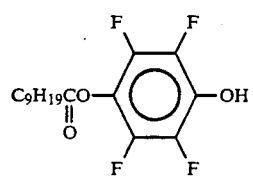 (3-37)
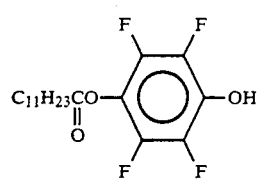 (3-38)
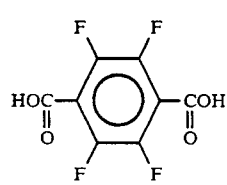 (3-39)
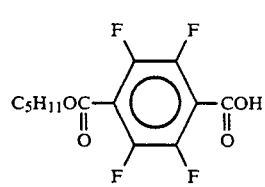 (3-40)
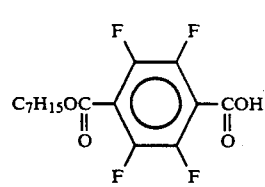 (3-41)
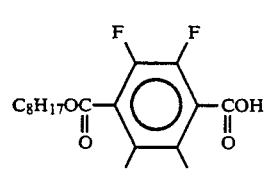 (3-42)
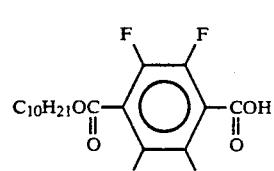 (3-43)
-continued
(3-44)
(3-45)
(3-46)
(3-47)
(3-48)
(3-49)
(3-50)
(3-51)
(3-52)

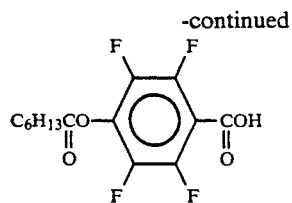 (3-53)
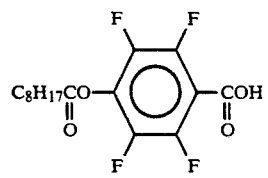 (3-54)
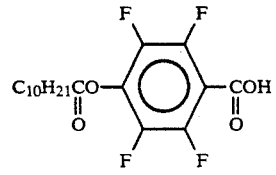 (3-55)
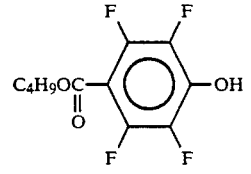 (3-56)
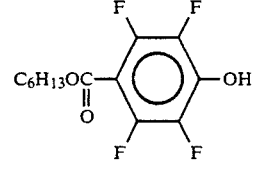 (3-57)
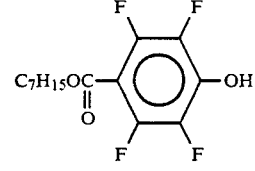 (3-58)
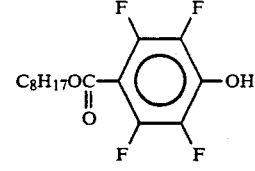 (3-59)
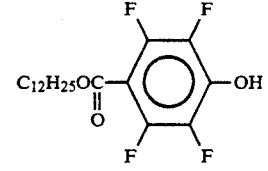 (3-60)
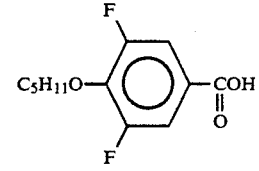 (3-61)
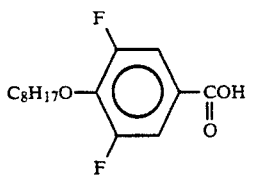 (3-62)
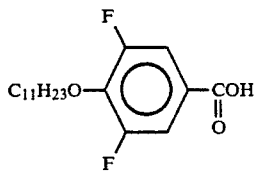 (3-63)
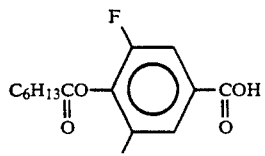 (3-64)
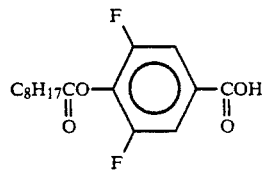 (3-65)
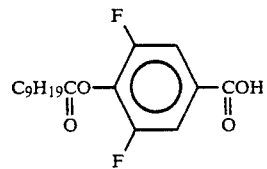 (3-66)
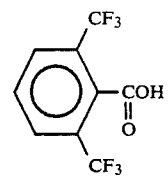 (3-67)
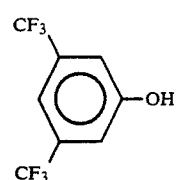 (3-68)
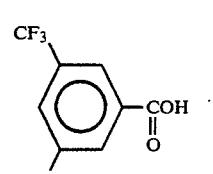 (3-69)
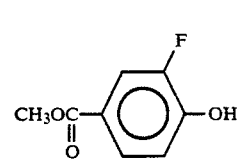 (3-70)

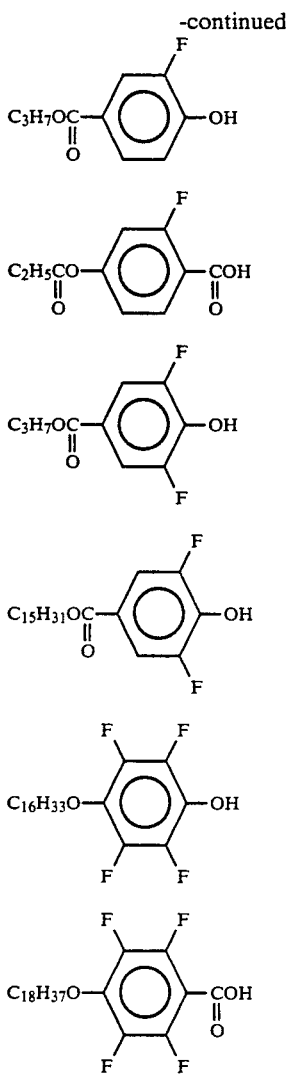

The resistivity modifier represented by the formula (III) may generally be synthesized through the following reaction schemes.

(Case where $X_2$ is —O—)

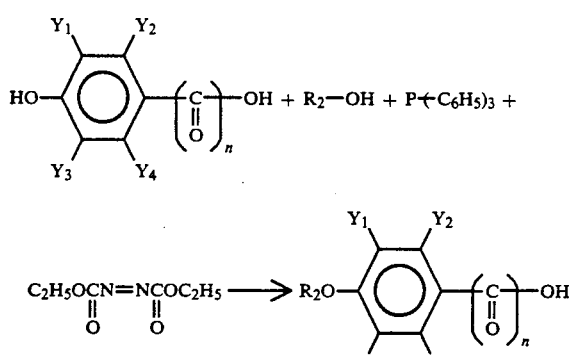

(Case where $X_2$ is —CO—)
$\phantom{xxxx}\underset{\underset{O}{\|}}{}$

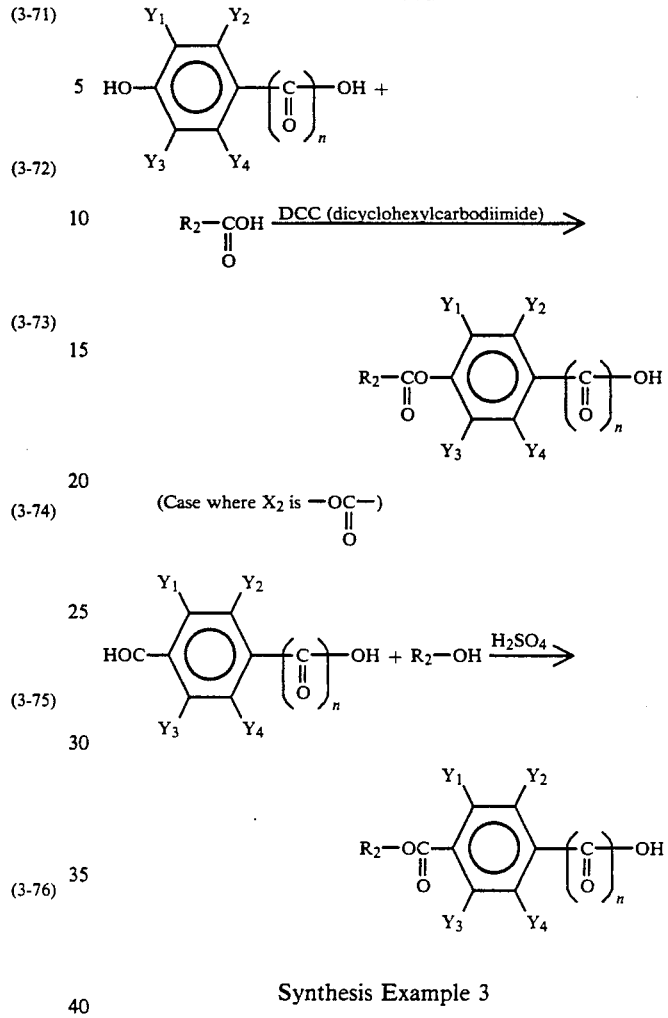

(Case where $X_2$ is $-\underset{\underset{O}{\|}}{O}C-$)

Synthesis Example 3

Production of 4-nonanoyloxy-2,3,5,6-tetrafluorophenol (Example Compound No. 3-33)

2.0 g (11.0 mM) of 2,3,5,6-tetrafluorohydroquinone, 0.87 g (5.5 mM) of nonanoic acid, 1.13 g (5.5 mM) of dicyclohexylcarbodiimide and a catalytic amount of 4-pyrrolidinopyridine were added to 20 ml of tetrahydrofuran, followed by stirring for 3 hours at room temperature. After the reaction, the insoluble residue was filtered off, followed by distilling-off of the solvent to obtain a crude product. The crude product was purified by silica gel column chromatography (eluent: toluene) to obtain 0.57 g of an objective product (Yield: 32.2%).

Synthesis Example 4 production of octyl 4-hydroxy-3-fluorobenzoate (Example Compound No. 3-2)

To 40 ml of 1,2-dichloroethane, 2.0 g (12.8 mM) of fluorobenzoic acid, 5.0 g (38.5 mM) of n-octanol and 20 ml of concentrated sulfuric acid were added, followed by heat-refluxing for 8 hours. After the reaction, the reaction mixture was poured into 100 ml of water and extracted three times with 50 ml of dichloromethane. The organic layer was repeatedly washed with water until the washing liquid showed a neutral pH value, followed by drying with anhydrous magnesium sulfate and further filtration. The solvent was distilled off and the resultant crude product was purified by silica gel column chromatography (eluent: toluene/ethyl acetate=5/1) to obtain 1.26 g of an objective product (Yield: 36.6%).

In the formula (IV) described above, $R_3$ may preferably include any of the following groups (i) and (ii):

(i) an n-alkyl group having 1-18 carbon atoms, particularly 4-14 carbon atoms; and (ii)

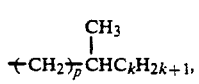

wherein p denotes an integer of 0-7 and k denotes an integer of 1-9 (optically active or inactive when k is 2 or above).

Further, $X_4$ may preferably be —O— or

when m is 0 and may preferably be

when m is 1. $X_3$ may preferably be a single bond when —A— is

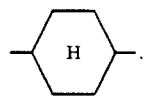

Specific example of the resistivity modifier represented by the formula (IV) may include those denoted by the following structural formulas.

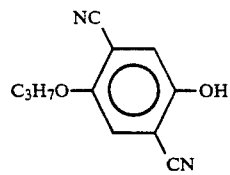
(4-1)

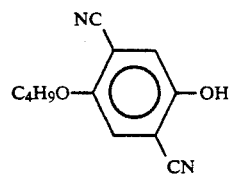
(4-2)

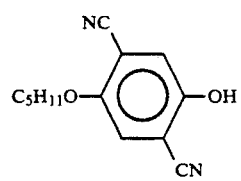
(4-3)

-continued

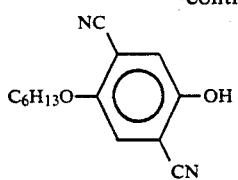
(4-4)

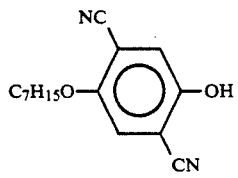
(4-5)

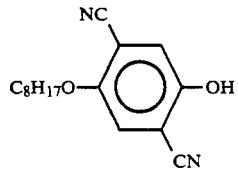
(4-6)

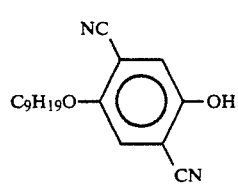
(4-7)

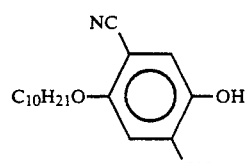
(4-8)

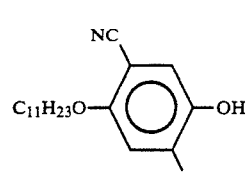
(4-9)

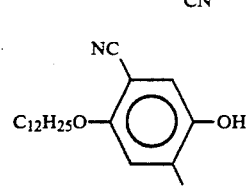
(4-10)

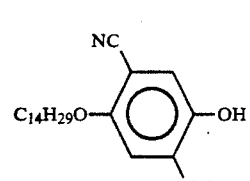
(4-11)

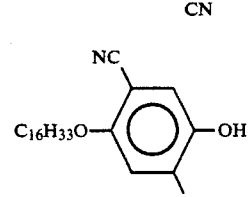
(4-12)

-continued
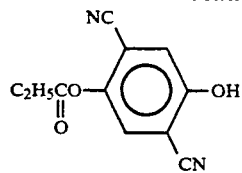 (4-13)
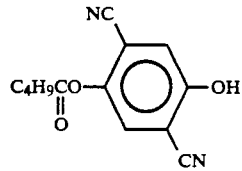 (4-14)
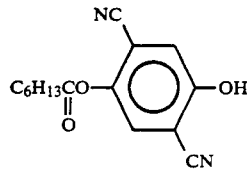 (4-15)
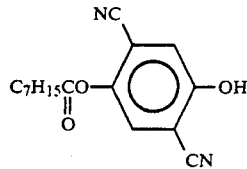 (4-16)
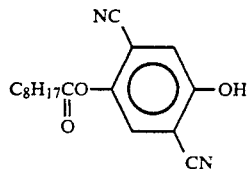 (4-17)
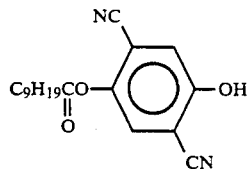 (4-18)
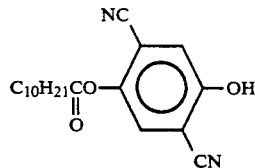 (4-19)
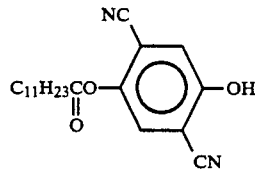 (4-20)
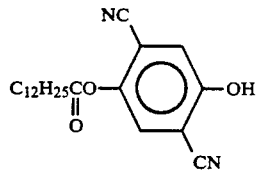 (4-21)
-continued
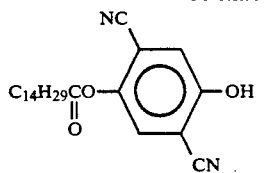 (4-22)
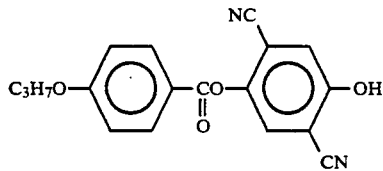 (4-23)
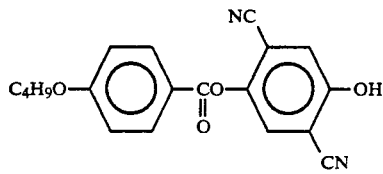 (4-24)
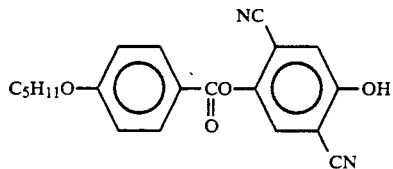 (4-25)
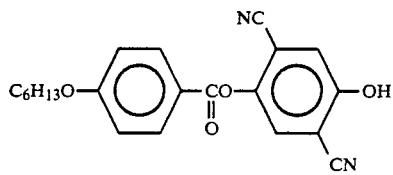 (4-26)
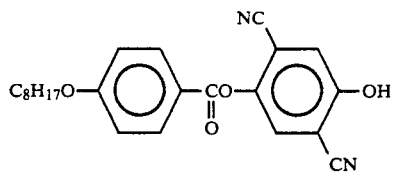 (4-27)
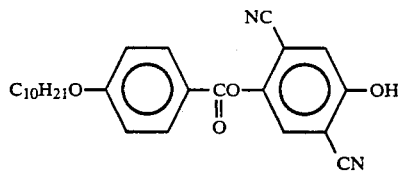 (4-28)
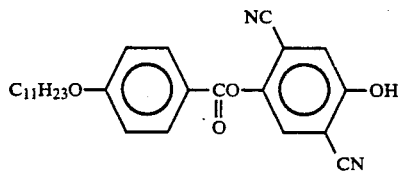 (4-29)
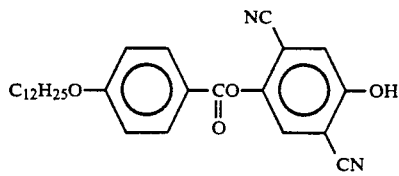 (4-30)

-continued
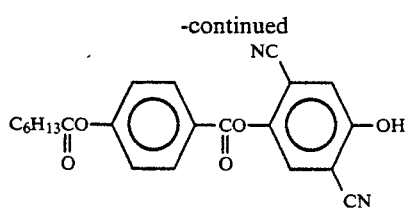 (4-31)
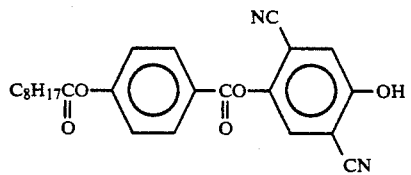 (4-32)
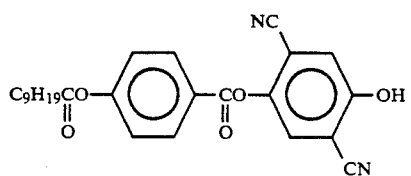 (4-33)
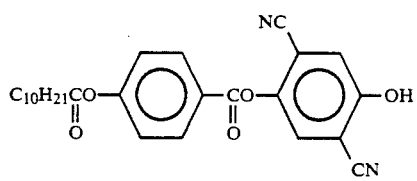 (4-34)
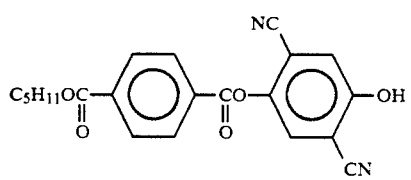 (4-35)
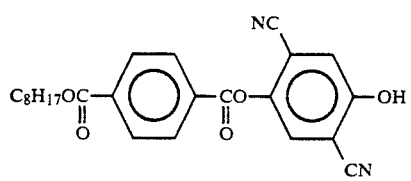 (4-36)
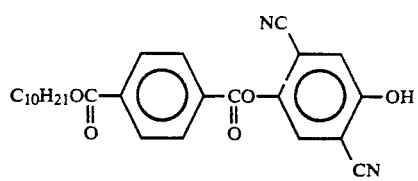 (4-37)
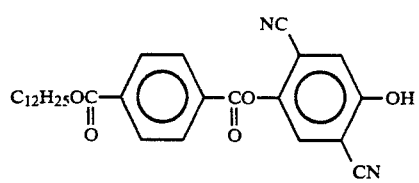 (4-38)
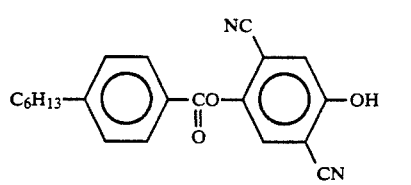 (4-39)
-continued
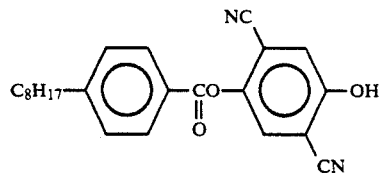 (4-40)
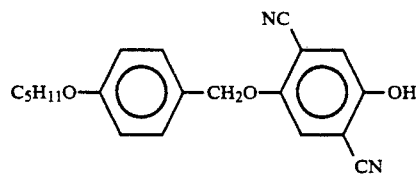 (4-41)
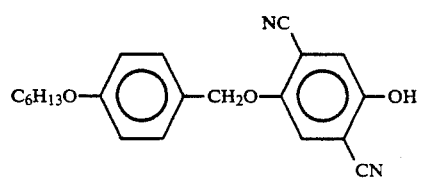 (4-42)
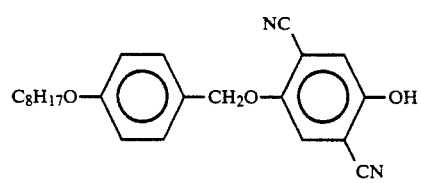 (4-43)
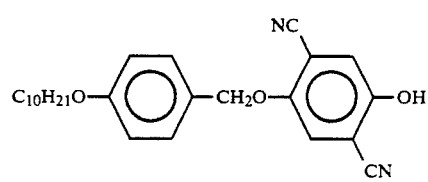 (4-44)
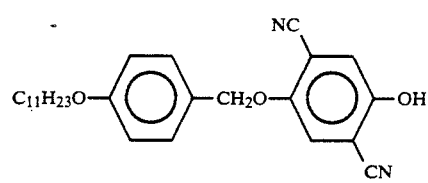 (4-45)
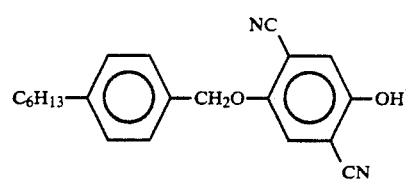 (4-46)
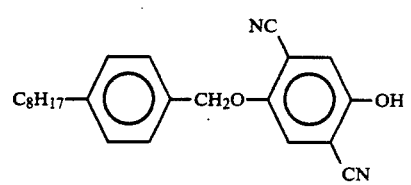 (4-47)
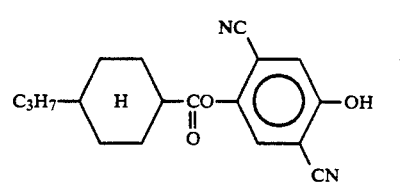 (4-48)

-continued
(4-49) 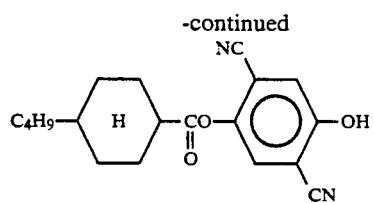
(4-50) 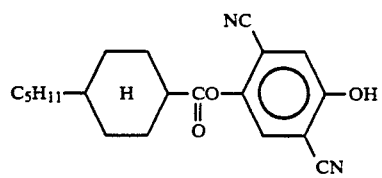
(4-51) 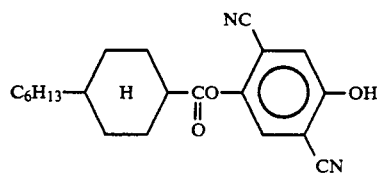
(4-52) 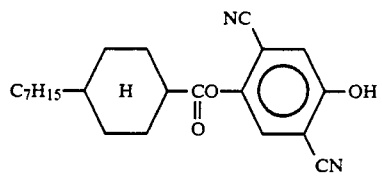
(4-53) 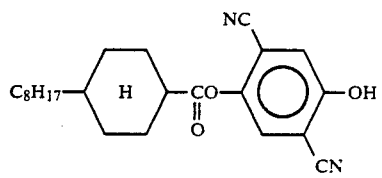
(4-54) 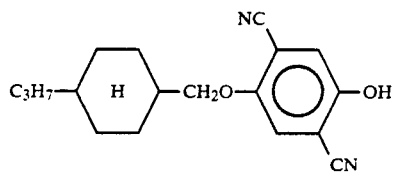
(4-55) 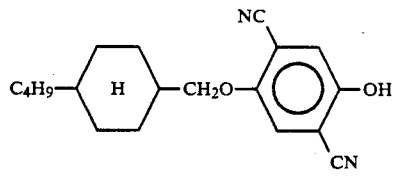
(4-56) 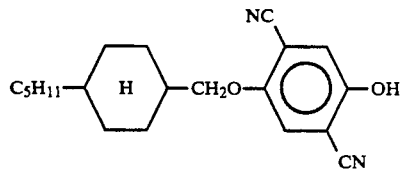
(4-57) 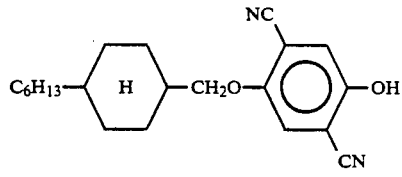
-continued
(4-58) 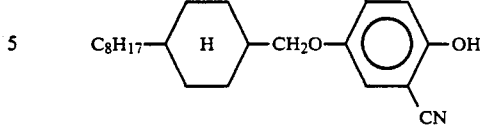
(4-59) 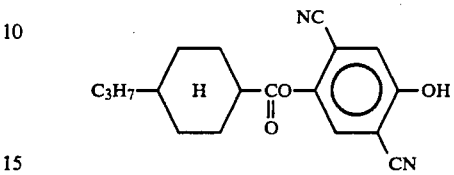
(4-60) 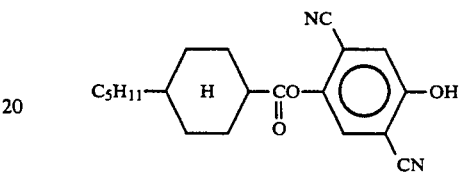
(4-61) 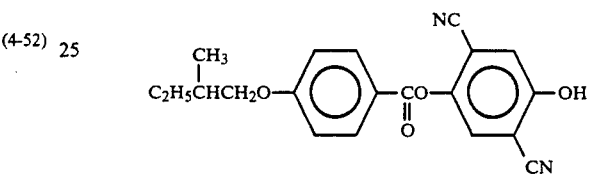
(4-62) 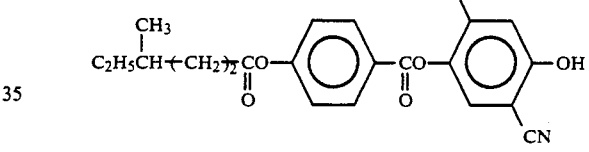
The resistivity modifier represented by the formula (IV) may generally be synthesized through the following reaction schemes.
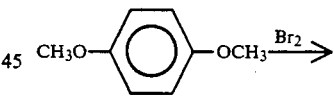
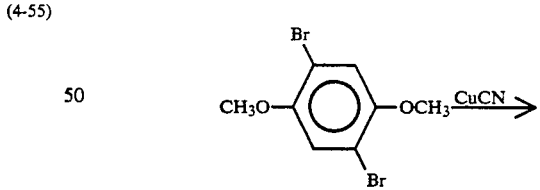
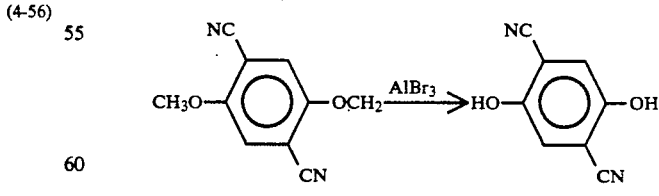
(Case where $X_4$ is $-O-$)
① when m is 0 or 1 and A is 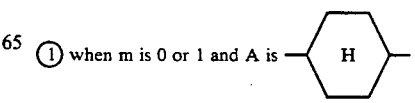

-continued

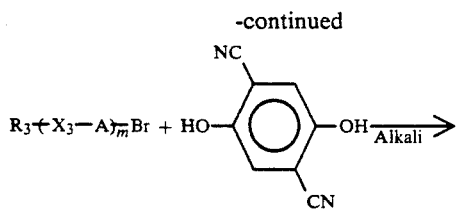

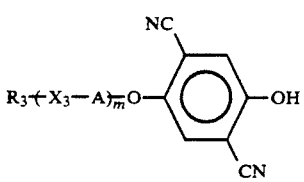

(2) when m is 1 and A is 

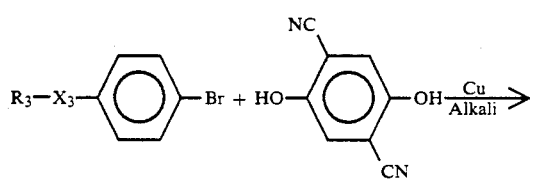

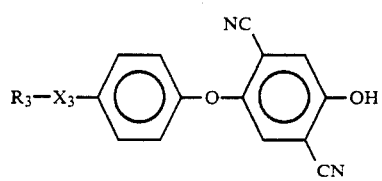

(Case where X₄ is —CO—)
          ‖
          O

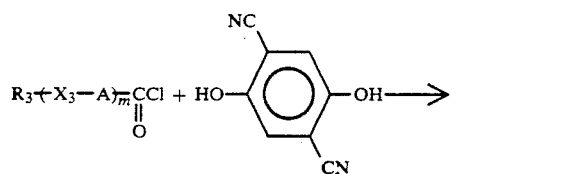

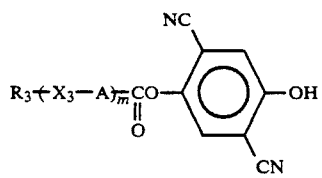

(Case where X₄ is —CH₂O—)

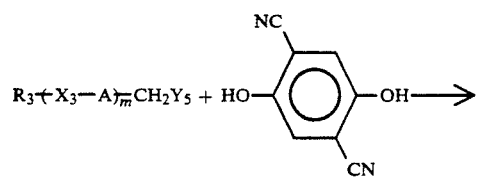

-continued

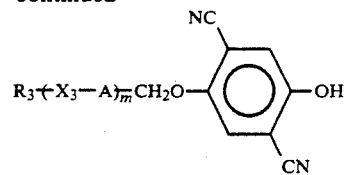

In the above, R₃, X₃, A and m are the same as defined above, and Y₅ denotes a group such as —Br, —I or

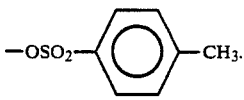

Synthesis Example 5

4-hexyloxy-2,5-dicyanophenol (Example Compound No. 4-3) was synthesized through the following steps i) to iv).

Step i)

In a 2 liter-reaction vessel, 200 g (1.45M) of hydroquinone dimethyl ether and 1 liter of gracial acetic acid were placed. To the mixture, a solution of 463 g (2.90M) of bromine in 300 ml of gracial acetic acid was added dropwise in 3 hours below 10° C., followed by stirring for 20 hours at room temperature to precipitate a crystal. The crystal was recovered by filtration and washed successively with water and methanol, followed by drying to obtain 323 g of 2,5-dibromo-1,4-dimethoxybenzene (Yield: 75.3%).

Step ii)

In a 3 liter-reaction vessel, 300 g (1.01M) of 2,5-dibromo-1,4-dimethoxybenzene, 215 g (2.40M) of cuprous cyanide and 1.5 liters of DMF (N,N-dimethylformamide) were placed, followed by heat-refluxing for 8 hours. After the reaction, the reaction mixture was cooled and poured into a solution of ferric chloride hexahydrate in 1.6N-hydrochloric acid to precipitate a crystal. The crystal was recovered by filtration and washed successively with 20%-ammonia water, water, and methanol, followed by drying to obtain 142 g of 2,5-dicyano-1,4-dimethoxybenzene (Yield: 74.8%).

Step iii)

In a 5 liter-reaction vessel, 100 g (5.32×10⁻¹M) of 2,5-dicyano-1,4-dimethoxybenzene, 312.5 g (1.17 M) of anhydrous aluminum tribromide and 2.5 liters of dry benzene were placed, followed by heat-refluxing for 7 hours. After the reaction, the reaction mixture as cooled and poured into a mixture of 3 kg of crushed ice and 500 ml of concentrated hydrochloric acid to precipitate a crystal. The crystal was recovered by filtration and dissolved in 2N-sodium hydroxide aqueous solution. The resultant insoluble residue was filtered off and the filtrate was acidified with 2N-hydrochloric acid to precipitate a crystal. The crystal was recovered by filtration and washed with water, followed by drying to obtain 35.5 g of 2,5-dicyanohydroquinone (Yield: 41.7%).

Step iv)

In a 300 ml-reaction vessel, 35.0 g (2.19×10⁻¹M) of 2,5-dicyanohydroquinone, 23.8 g (1.44×10⁻¹M) of n-hexylbromide, 20.0 g (1.45×10⁻¹M) of potassium carbonate and 180 ml of DMF were placed, followed by stirring for 3 hours at 120° C. After the reaction, the reaction mixture was cooled and poured into 500 ml of 4N-hydrochloric acid, followed by extraction with ethyl acetate. The organic layer was washed with water and dried with anhydrous magnesium sulfate, followed by distilling-off of the solvent. The resultant residue was purified by silica gel column chromatography (eluent: n-hexane/ethyl acetate=2/1) to obtain 17.6 g of a crude product. The crude product was dissolved in ethanol and treated with activated carbon, followed by recrystallization from ethanol to obtain 8.2 g of 4-hexyloxy-2,5-dicyanophenol (Yield: 22.9%).

When a liquid crystal composition containing a large amount of at least one resistivity modifier represented by the formulas (I)–(IV) is used, there occur difficulties such that a temperature assuming a mesomorphic phase is excessively lowered, the resistivity modifier is precipitated at a low temperature and response speed of a liquid crystal device is lowered by the influence of the dicyano structure increasing a viscosity of a liquid crystal layer. On the other hand, when a very small amount of at least one resistivity modifier is used, a liquid crystal composition containing the modifier cannot provide a liquid crystal layer having a sufficiently low resistivity.

In formulating the liquid crystal composition according to the present invention, at least one resistivity modifier represented by the formulas (I)–(IV) may preferably be contained at 0.01-5 wt. %, more preferably 0.05-2 wt. %, further preferably 0.2-1 wt. % in the composition. When two or more species of resistivity modifiers represented by the formulas (I) to (IV) are used, the two or more species of resistivity modifiers of the formulas (I) to (IV) may preferably be contained at 0.01-10 wt. %, more preferably 0.01-4 wt. %, further preferably 0.2-2 wt. % in the composition. Further, the above-mentioned two or more species of resistivity modifiers may be selected from those represented by at least one of the formulas (I) to (IV). By using two or more species of resistivity modifiers, it is possible to increase the addition amount thereof to the composition without precipitation. For example, when 3 wt. % of one resistivity modifier used in the present invention is added to the composition, there can occur precipitation of the resistivity modifier due to poor solubility at a lower temperature in particular though a resistivity of a liquid crystal layer is sufficiently lowered. On the other hand, when two resistivity modifiers having different carbon atoms, e.g., represented by the formula (I) is added to the composition in a total amount of 3 wt. %, the addition amount of each resistivity modifier can be 1.5 wt. %. As a result, no precipitation occurs even at a lower temperature and a low resistivity state can be retained stably.

The liquid crystal composition according to the present invention containing at least one resistivity modifier represented by the formulas (I) to (IV) may assume a mesomorphic phase such as a nematic phase, a cholesteric phase, a smectic phase or a chiral smectic phase.

The liquid crystal device according to the present invention may preferably be prepared by heating the liquid crystal composition prepared as described above into an isotropic liquid under vacuum, filling a blank cell comprising a pair of oppositely spaced electrode plates with the composition, gradually cooling the cell to form a liquid crystal layer and restoring the normal pressure.

FIG. 1 is a schematic sectional view of an embodiment of the liquid crystal device utilizing ferroelectricity prepared as described above for explanation of the structure thereof.

Referring to FIG. 1, the liquid crystal device includes a liquid crystal layer 18 assuming a chiral smectic phase disposed between a pair of glass substrates 11 each having thereon a transparent electrode 12 comprising a film of, e.g., ITO (indium-tin-oxide) and an insulating and alignment control layer 13. The liquid crystal layer 18 comprises a position ion 14 and a negative ion 15. In the liquid crystal layer 18, liquid crystal molecules show two stable states 16 and 17.

Figure 5:
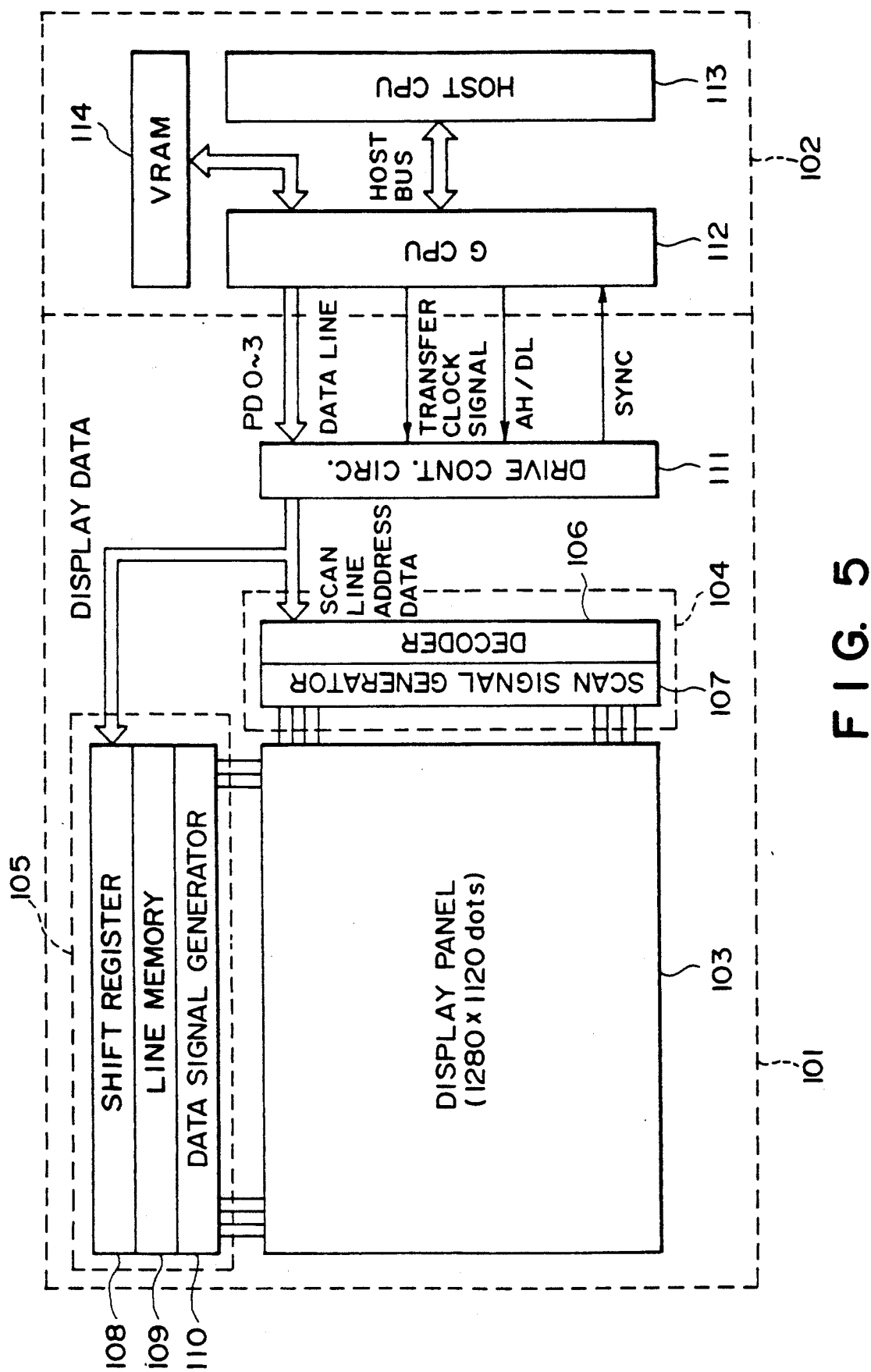
FIG. 5 is a block diagram showing a display apparatus comprising a liquid crystal device utilizing ferroelectricity of a liquid crystal composition, and a graphic controller.
Figure 6:
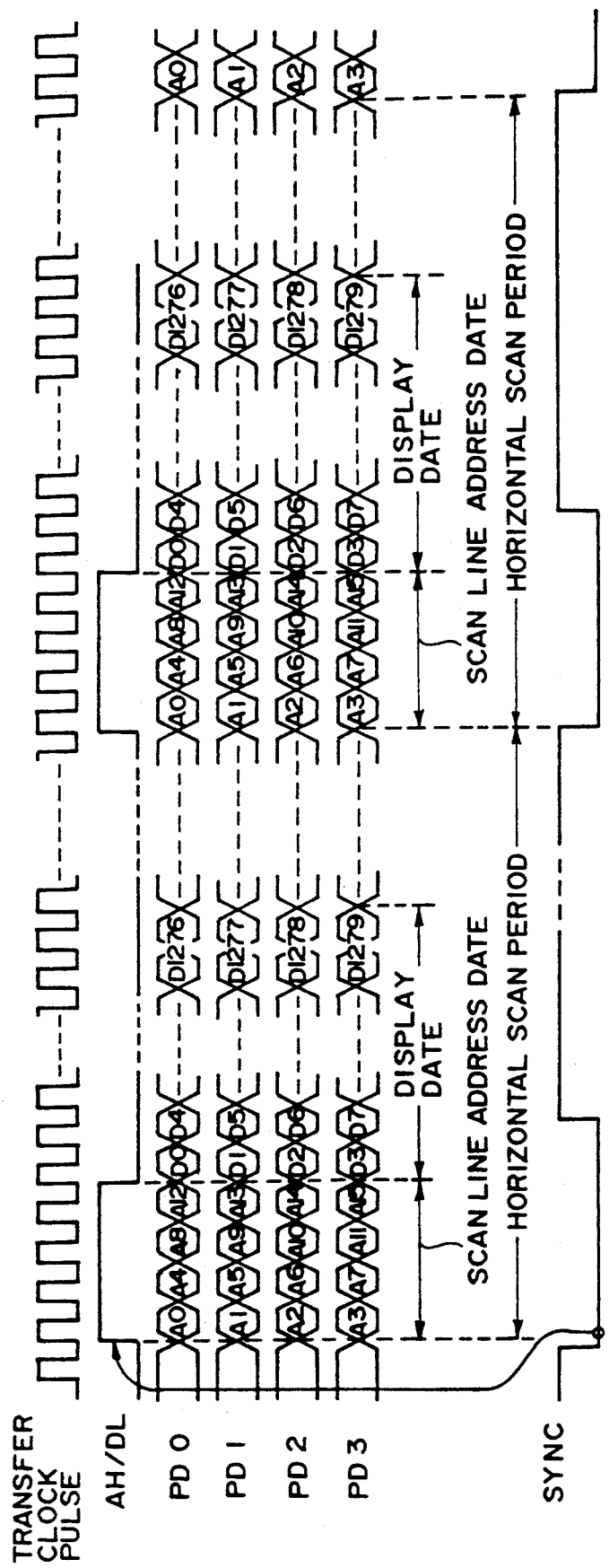
FIG. 6 is a time chart of image data communication showing time correlation between signal transfer and driving with respect to a liquid crystal display apparatus and a graphic controller.

Based on the arrangement and data format comprising image data accompanied with scanning line address data and by adopting communication synchronization using a SYNC signal as shown in FIGS. 5 and 6, there is provided a liquid crystal display apparatus of the present invention which uses the liquid crystal device according to the present invention as a display panel portion.

Referring to FIG. 5, the ferroelectric liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

In FIG. 5, the liquid crystal device further comprises a pair of cross nicol polarizing plates.

Image data are generated in the graphic controller 102 in an apparatus body and transferred to a display panel 103 by signal transfer means shown in FIGS. 5 and 6. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally realized in the graphic controller 102. A light source is disposed at the back of the display panel 103.

Hereinbelow, the present invention will be explained more specifically with reference to Examples.

Example 1

A ferroelectric liquid crystal device (cell) having a 1.5 micron-thick liquid crystal layer as shown in FIG. 1 was prepared in the following manner.

On each transparent electrode (ITO) 12 disposed on a pair of glass substrates 11, a 1000 Å-thick insulating layer 13 comprising $Ta_2O_5$ was formed by sputtering. Further, a 100 Å-thick alignment control layer 13 comprising polyimide (e.g., SE-100, mfd. by Nissan Kagaku K.K.) was formed on the insulating layer 13. The thus prepared pair of glass substrates were placed opposite to each other to prepare a blank cell.

Liquid crystal compositions having different spontaneous polarizations Ps were respectively prepared by mixing the following ingredients in prescribed proportions.

(Ingredients of Liquid Crystal Compositions)

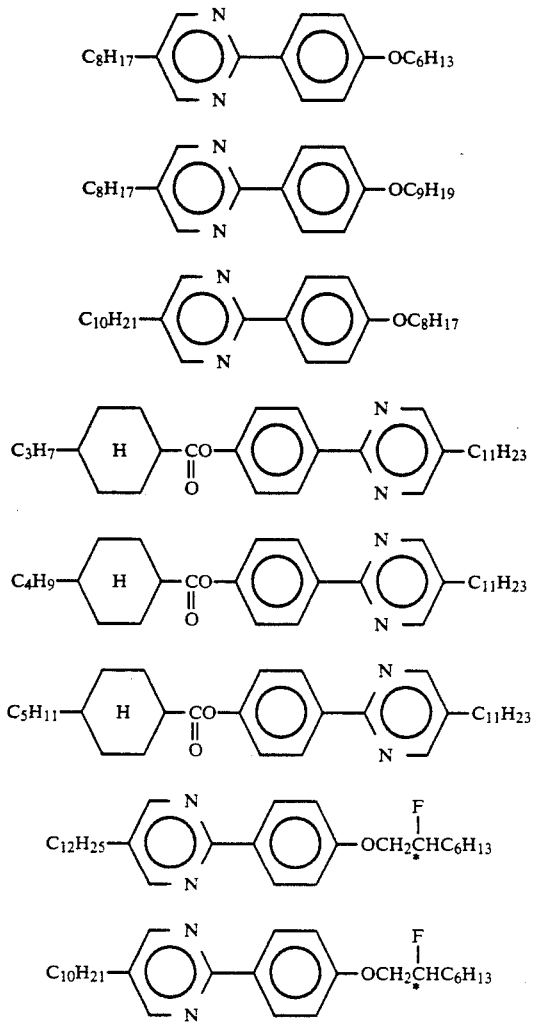

A resistivity modifier (Example Compound No. 1-10) represented by the formula (I) was added to each liquid crystal composition prepared above in an amount of 1 wt. %, and then each of the resultant liquid crystal compositions was injected into the blank cell to prepare the ferroelectric liquid crystal device (cell).

A control cell was prepared separately by omitting the insulating layer. A saturation voltage pulse sufficient to cause a 100% inversion for the control cell was applied to each sample cell and the areal proportion of the inverted proportion was measured in terms of a ratio of the transmittance through the sample cell to that through the control cell. The results are shown in Table 1 below.

TABLE 1

| | Inverted Proportion (%) (at 25° C.) | |
|---|---|---|
| | Resistivity Modifier (1 wt. %) | |
| Ps (nC/cm²) | Added | Not added |
| 30 | about 60 | ≦40 |
| 25 | 90 | about 60 |
| 20 | 100 | 80 |
| 15 | 100 | 90 |
| 10 | 100 | 100 |

As apparent from the above results, the reverse voltage was attenuated quickly to improve the bistable switching characteristic of the liquid crystal device of the present invention by using the liquid crystal composition of the present invention.

Examples 2-7

Ferroelectric liquid crystal cells were prepared in the same manner as in Example 1 except that a resistivity modifier and the addition amount thereof were changed as shown in Table 2 appearing hereinafter.

The above-prepared liquid crystal compositions or liquid crystal cells were subjected to evaluation of various cell characteristics as follows:

Volume resistivity ($\rho_{LC}$)

The resistivity of a liquid crystal layer ($R_{LC}$) for measurement is measured by a method shown in FIG. 3A. Referring to FIG. 3A, a rectangular wave is applied from a function generator to a cell 31 for resistivity measurement to which a Mylar capacitor 32 (capacitance: Ci) is externally applied. The cell 31 comprises an alignment layer comprising a thin polyimide film (thickness: <50 Å) disposed on an ITO electrode. A voltage waveform of the cell 31 measured through a buffer amplifier 34 is given, e.g., as shown in FIG. 3B. In FIG. 3B, a maximum voltage $V_0$ is attempted to $V_0/e$ (e: the base of natural logarithm) in a time $\tau$ (sec) counted from the polarity inversion of a rectangular wave. At this time, the resistivity $R_{LC}$ is measured through an oscilloscope and given by the following equation: $R_{LC} = \tau/(C_i + C_{LC})(\Omega/\text{cm}^2)$. The volume resistivity $\rho_{LC}$ is obtained from the following equation: $\rho_{LC} = R_{LC} \cdot S/d_{LC}$, wherein S denotes an electrode area and $d_{LC}$ denotes the thickness of the liquid crystal layer.

Response Retardation Time

Figure 4A:
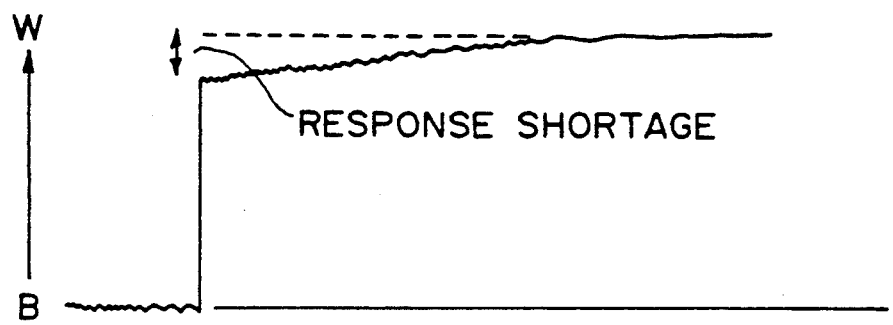
FIGS. 4A and 4B are diagrams for illustrating an optical response characteristic when the orientation of liquid crystal molecules is switched from B (black) state to W (white) state by pulse voltage application.

FIG. 4A shows a change in luminance (transmittance) based on a photomultiplier output signal level of "white" when a pulse voltage for switching into "white" is applied to a cell which is currently showing "black" under right-angle cross-nicol polarizers. In several seconds, the level of luminance is lower than the saturation level. We refer to this phenomenon as "shortage or retardation of response". A time from the pulse voltage application until the luminance reaches the prescribed "white" level is referred to as "response retardation time".

The above-mentioned response retardation may be attributable to a phenomenon that the reverse voltage causes liquid crystal molecules to return to "black" when a pulse for switching from "black" to "white" is applied, thus lowering the luminance of "white" level during the presence of the reverse voltage.

The above-prepared liquid crystal composition or liquid crystal cells were respectively subjected to measurement of the volume resistivity ($\rho_{LC}$) and the response retardation time described above. The results are shown in Table 2 below.

TABLE 2

| (Ps = 10 nC/cm², at 25° C.) | | | |
|---|---|---|---|
| Resistivity modifier (Ex. Comp. No.) | Addition amount (wt. %) | $\rho_{LC}$ ($\Omega$cm) | Response retardation time (sec) |
| Comp. Ex. Not added | — | $2 \times 10^{11}$ | >2 |
| Ex. 2 (1-10) | 1 | $2 \times 10^9$ | 0.02 |
| Ex. 3 (1-10)/(1-7) [50/50 by wt.] | 0.05 | $5 \times 10^{10}$ | 0.6 |

TABLE 2-continued (Ps = 10 nC/cm², at 25° C.)

| | Resistivity modifier (Ex. Comp. No.) | Addition amount (wt. %) | $\rho_{LC}$ ($\Omega$cm) | Response retardation time (sec) |
|---|---|---|---|---|
| Ex. 4 | (1-10)/(1-7) [50/50 by wt.] | 0.1 | $9 \times 10^9$ | 0.1 |
| Ex. 5 | (1-10)/(1-7) [50/50 by wt.] | 0.25 | $6 \times 10^9$ | 0.07 |
| Ex. 6 | (1-10)/(1-7) [50/50 by wt.] | 0.5 | $2.5 \times 10^9$ | 0.03 |
| Ex. 7 | (1-10)/(1-7) [50/50 by wt.] | 1.0 | $1.4 \times 10^9$ | 0.02 |

Figure 4B:
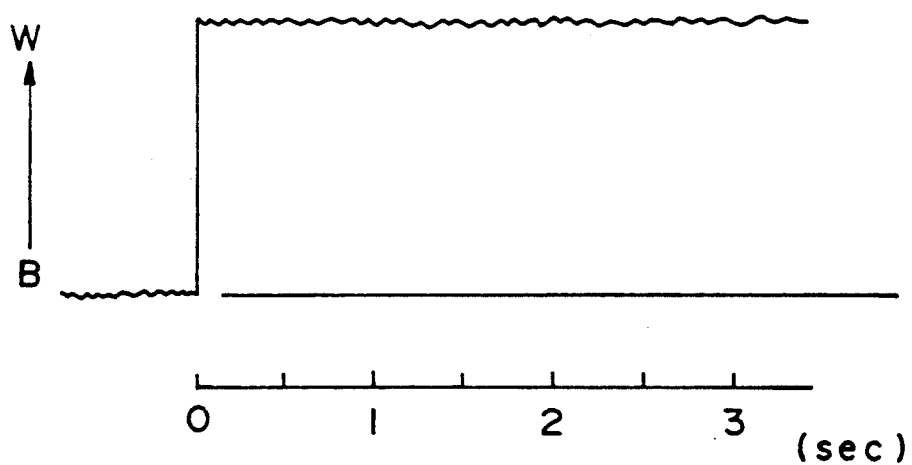

As apparent from the above results, the volume resistivity of the liquid crystal layer was stably and repetitively lowered by adding the resistivity modifier used in the present invention. Further, as shown in FIG. 4, the response retardation substantially or completely disappeared to remarkably decrease panel afterimages (image (e.g., "black") remaining on subsequently displayed images (e.g., "white") in a display panel).

Example 8

Ferroelectric liquid crystal cells were prepared in the same manner as in Example 1 except that the resistivity modifier of Ex. Comp. Nos. (1-1), (1-3), (1-6), (1-16), (1-24), (1-25), (1-28) and (1-32) were used. The above prepared liquid crystal compositions or cells were respectively subjected to measurement of a volume resistivity ($\rho_{LC}$) and a response retardation time in the same manner as in Examples 2-7 to obtain good display characteristics with decreased panel afterimages.

Example 9

Ferroelectric liquid crystal cells were prepared in the same manner as in Example 1 except for using the resistivity modifier of Ex. Comp. No. (2-4) instead of (1-10) and respectively subjected to measurement of an inverted proportion. The results are shown in Table 3 below.

TABLE 3

Inverted Proportion (%) (at 25° C.)

| Ps (nC/cm²) | Resistivity Modifier (1 wt. %) Added | Not added |
|---|---|---|
| 30 | about 60 | ≦40 |
| 25 | 90 | about 60 |
| 20 | 100 | 80 |
| 15 | 100 | 90 |
| 10 | 100 | 100 |

From the above results, we recognized that the reverse voltage was attenuated quickly to improve the bistable switching characteristic by using the liquid crystal composition of the present invention.

Examples 10-14

Ferroelectric liquid crystal cells were prepared in the same manner as in addition amounts shown in Table 4 below were used. The above prepared liquid crystal cells were respectively subjected to measurement of a volume resistivity ($\rho_{LC}$) and a response retardation time in the same manner as in Examples 2-7. The results are shown in Table 4 below.

TABLE 4

(Ps = 10 nC/cm², at 25° C.)

| | Resistivity modifier (Ex. Comp. No.) | Addition amount (wt. %) | $\rho_{LC}$ ($\Omega$cm) | Response retardation time (sec) |
|---|---|---|---|---|
| Comp. Ex. | Not added | — | $2 \times 10^{11}$ | >2 |
| Ex. 10 | (2-20) | 1 | $4 \times 10^9$ | 0.06 |
| Ex. 11 | (2-19)/(2-20) [50/50 by wt.] | 0.05 | $7 \times 10^{10}$ | 1 |
| Ex. 12 | (2-19)/(2-20) [50/50 by wt.] | 0.1 | $2 \times 10^{10}$ | 0.5 |
| Ex. 13 | (2-19)/(2-20) [50/50 by wt.] | 0.4 | $8 \times 10^9$ | 0.2 |
| Ex. 14 | (2-19)/(2-20) [50/50 by wt.] | 1.0 | $4 \times 10^9$ | 0.1 |

From the above results, the liquid crystal composition of the present invention containing the resistivity modifier had a lower volume resistivity to shorten the response retardation time, whereby panel after images were decreased.

Example 15

Liquid crystal cells were prepared in the same manner as in Example 1 by using commercial available liquid crystals shown in Table 5 below. The liquid crystal cells were respectively subjected to measurement of a volume resistivity ($\rho_{LC}$) and a response retardation time in the same manner as in Examples 2-7. The results are shown in Table 5 below.

TABLE 5

(at 30° C.)

| Liquid Crystal | | $\rho_{LC}$ ($\Omega$cm) | Response retardation time (sec) |
|---|---|---|---|
| CS-1014 (mfd. by Chisso K.K.) | Comp. Ex. ... Not added | $3.5 \times 10^{11}$ | 2.5 |
| | Ex. 15 ... 1 wt. % added (Ex. Comp. No. 2-20) | $2.5 \times 10^9$ | 0.04 |
| ZLI-3654 (mfd. by E. Merck) | Comp. Ex. ... Not added | $9 \times 10^{10}$ | 1.1 |
| | Ex. 15 ... 1 wt. % added (Ex. Comp. No. 2-20) | $3 \times 10^9$ | 0.05 |

Even when other liquid crystals were used instead of the liquid crystal composition of the present invention, the resistivity modifier used in the present invention could lower the volume resistivity and the response retardation time of each of such different liquid crystals.

Example 16

Ferroelectric liquid crystal cells were prepared in the same manner as in Example 10 except that the resistivity modifiers of Ex. Comp. Nos. (2-2), (2-8), (2-9), (2-11), 2-15), (2-23) and (2-27) were used instead of (2-20), and respectively subjected to measurement of a volume resistivity ($\rho_{LC}$) and a response retardation time in the same manner as in Examples 2-7 to obtain good display characteristics with decreased panel after images similar to those in Example 10.

Example 17

Ferroelectric liquid crystal cells were prepared in the same manner as in Example 1 except for using the resistivity modifier of Ex. Comp. No. (3-28) instead of (1-10) and respectively subjected to measurement of a reverse proportion. The results are shown in Table 6 below. Further, volume resistivities of the above-prepared liquid crystal cells showed the following values.

Before Addition $\rho_{LC} \gtrsim 2 \times 10^{11}$ (Ω.cm)

After Addition (1 wt. % added)

$\rho_{LC} \approx 4 \times 10^{10}$ (Ω.cm)

TABLE 6

| | Inverted Proportion (%) (at 25° C.) | |
|---|---|---|
| | Resistivity Modifier (1 wt. %) | |
| Ps (nC/cm$^2$) | Added | Not added |
| 25 | 70 | 60 |
| 20 | 90 | 80 |
| 15 | 100 | 90 |
| 10 | 100 | 100 |

From the above results, we recognized that the reverse voltage was attenuated quickly to increase bistability by using the liquid crystal composition of the present invention having a decreased volume resistivity.

Examples 18-20

Ferroelectric liquid crystal cells were prepared in the same manner as in addition amounts shown in Table 7 below were used. The above prepared liquid crystal cells were respectively subjected to measurement of a volume resistivity ($\rho_{LC}$) and a response retardation time in the same manner as in Examples 2-7. The results are shown in Table 7 below.

TABLE 7

| (Ps = 10 nC/cm$^2$, at 25° C.) | | | |
|---|---|---|---|
| Resistivity modifier (Ex. Comp. No.) | Addition amount (wt. %) | $\rho_{LC}$ (Ωcm) | Response retardation time (sec) |
| Comp. Ex. Not added | — | 2 × 10$^{11}$ | >2 |
| Ex. 18 (3-28) | 1.0 | 4.1 × 10$^{10}$ | 0.5 |
| Ex. 19 (3-68) | 1.0 | 1.0 × 10$^{10}$ | 0.15 |
| Ex. 20 (3-39) | 1.0 | 8.9 × 10$^9$ | 0.1 |

From the above results, the liquid crystal composition of the present invention containing the resistivity modifier had a lower volume resistivity to shorten the response retardation time, whereby panel after images were decreased.

Example 21

Ferroelectric liquid crystal cells were prepared in the same manner as in Example 18 except that the resistivity modifiers of Ex. Comp. Nos. (3-1), (3-5), (3-11), (3-15), (3-42), (3-61) and (3-67) were used instead of (3-28), and respectively subjected to measurement of a volume resistivity ($\rho_{LC}$) and a response retardation time in the same manner as in Examples 2-7 to obtain good display characteristics with decreased panel after images similar to those in Example 18.

Examples 22-27

Ferroelectric liquid crystal cells were prepared in the same manner as in addition amounts shown in Table 8 below were used. The above prepared liquid crystal cells were respectively subjected to measurement of a volume resistivity ($\rho_{LC}$) and a response retardation time in the same manner as in Examples 2-7. The results are shown in Table 8 below.

TABLE 8

| (Ps = 10 nC/cm$^2$, at 25° C.) | | | |
|---|---|---|---|
| Resistivity modifier (Ex. Comp. No.) | Addition amount (wt. %) | $\rho_{LC}$ (Ωcm) | Response retardation time (sec) |
| Comp. Ex. Not added | — | 2 × 10$^{11}$ | >2 |
| Ex. 22 (4—4) | 1 | 4 × 10$^9$ | 0.04 |
| Ex. 23 (4—4)/(4-6) [50/50 by wt.] | 0.05 | 7 × 10$^{10}$ | 0.8 |
| Ex. 24 (4—4)/(4-6) [50/50 by wt.] | 0.1 | 1.2 × 10$^{10}$ | 0.15 |
| Ex. 25 (4—4)/(4-6) [50/50 by wt.] | 0.25 | 8 × 10$^9$ | 0.09 |
| Ex. 26 (4—4)/(4-6) [50/50 by wt.] | 0.5 | 3 × 10$^9$ | 0.035 |
| Ex. 27 (4—4)/(4-6) [50/50 by wt.] | 1.0 | 2 × 10$^9$ | 0.03 |

From the above results, the liquid crystal of the present invention containing the resistivity modifier had a lower volume resistivity to shorten the response retardation time, whereby panel after images were decreased.

Example 28

Figure 7:
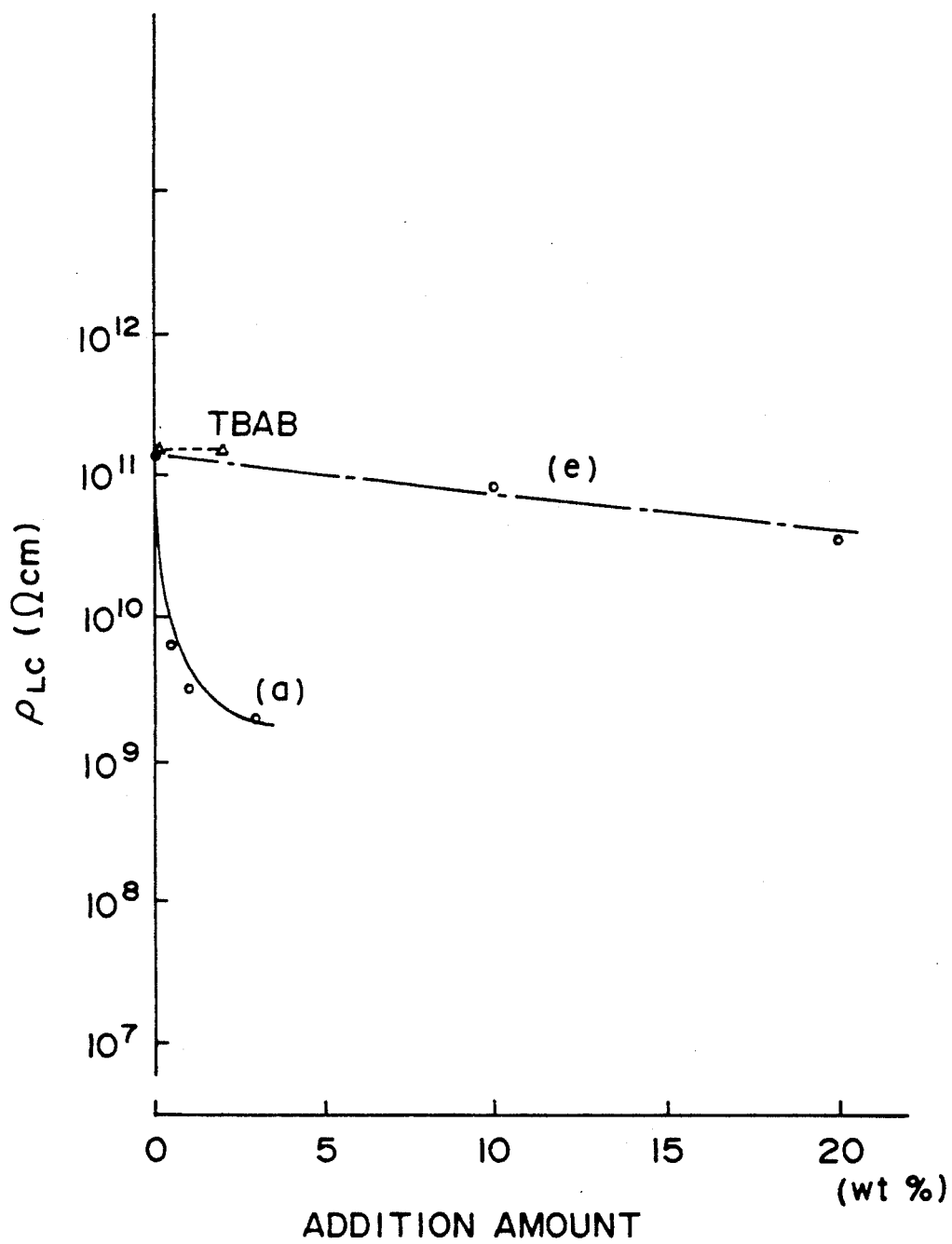
FIG. 7 is a graph showing results of Example 28 appearing hereinafter.

Liquid crystal cells were prepared by mixing a commercially available ferroelectric liquid crystal (CS-1014, mfd. by Chisso K.K.) with the materials shown below in prescribed proportions, and respectively subjected to measurement of a volume resistivity ($\rho_{LC}$) in the same manner as in Examples 2-7. The results are shown in FIG. 7.

Resistivity Modifier (a)

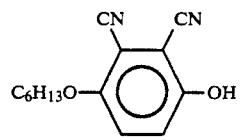
(Ex. Comp. No. 1-7)

Compound (e)

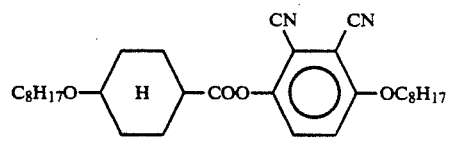

TBAB: (Bu)$_4$N$^+$·Br$^-$

As shown in FIG. 7, the resistivity modifier (a) used in the present invention could effectively lower the resistivity of the above liquid crystal cell in a small amount.

Examples 29-33

An N-type nematic liquid crystal composition containing no cyano group was prepared by using mesomorphic compounds represented by the following formulas in indicated proportions to show a clearing point of 72° C.

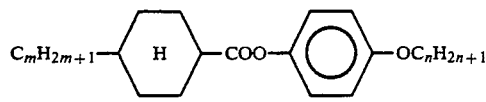

| m | n | wt. % |
|---|---|---|
| 3 | 2 | 16 |
| 3 | 4 | 24 |
| 4 | 2 | 29 |
| 4 | 4 | 11 |
| 5 | 1 | 20 |

The liquid crystal cells were prepared by mixing the above nematic liquid crystal composition with the following compounds (resistivity modifiers) in indicated proportions, and respectively subjected to measurement of a volume resistivity ($\rho_{LC}$) in the same manner as in Example 2-7. The results are shown in Table 9 below.

TABLE 9

| Compound No. | Ex. Comp. No. |
|---|---|
| (a) | (1-7) $C_6H_{13}O$—⌬(CN)(CN)—OH |
| (b) | (3-39) HOOC—⌬(F)(F)(F)(F)—COOH |
| (c) | (2-20) $C_5H_{11}$—H—$CH_2O$—⌬(CN)(CN)—OH |
| (d) | (4-4) $C_6H_{13}O$—⌬(CN)(CN)—OH (with extra CN) |

(at 25° C.)

| | Resistivity modifier (Comp. No.) | Addition amount (wt. %) | $\rho_{LC}$ ($\Omega \cdot cm$) |
|---|---|---|---|
| | Not added | — | $6.4 \times 10^{10}$ |
| Ex. 29 | (a) | 0.5 | $7.0 \times 10^8$ |
| Ex. 30 | (b) | " | $2.6 \times 10^9$ |
| Ex. 31 | (c) | " | $9.5 \times 10^8$ |
| Ex. 32 | (d) | " | $8.3 \times 10^8$ |
| Ex. 33 | (a)/(d) [50/50 by wt.] | 1.0 | $4.8 \times 10^8$ |

Separately, a blank cell was prepared by using two electrode plates each provided with an ITO film coated thereon with a homeotropic aligning agent (ODS-E, mfd. by Chisso K.K.) and applying the two electrode plates to each other. The cell gap was 10 microns and the thickness of the alignment layer was 50 Å (after drying).

Into the blank cell, the liquid crystal composition prepared in Example 29 was injected to prepare a liquid crystal device.

When a rectangular wave voltage (about ±8 V) was applied to the liquid crystal device, a dynamic scattering state was observed. Further, the dynamic scattering state was stable under the application voltage of ±15 V or above.

Examples 34-38

Liquid crystal cell were prepared in the same manner as in Examples 29-33 except that a p-type nematic liquid crystal having a cyano group (ZLI-2411, mfd. by E. Merck) was used instead of the nematic liquid crystal composition having no cyano group and that TBAB was used in Comparative Example.

The above-prepared cells were respectively subjected to measurement of a volume resistivity ($\rho_{LC}$) in the same manner as in Examples 2-7. The results are shown in Table 10 below.

TABLE 10

(at 25° C.)

| | Resistivity modifier (Comp. No.) | Addition amount (wt. %) | $\rho_{LC}$ ($\Omega cm$) |
|---|---|---|---|
| | Not added | — | $1.8 \times 10^{10}$ |
| Ex. | | | |
| 34 | (a) | 1.0 | $4.3 \times 10^8$ |
| 35 | (b) | 0.5 | $1.2 \times 10^9$ |
| 36 | (c) | 0.5 | $6.2 \times 10^8$ |
| 37 | (d) | 0.5 | $7.0 \times 10^8$ |
| 38 | (a)/(d) [50/50 by wt.] | 1.0 | $3.2 \times 10^8$ |
| Comp. Ex. | TBAB | 0.5 | $3.5 \times 10^7$ |

From the results of Tables 9 and 10, the resistivity modifiers (a) to (d) used in the present invention could effectively lower the resistivities of the above liquid crystals whether the liquid crystals had a cyano group or not.

Then, blank liquid crystal cells were respectively prepared by using a pair of electrode substrates each having a transparent electrode coated with an alignment film (thickness ≦50 Å (after drying)) for examining stability of a nematic liquid crystal composition.

Liquid crystal compositions respectively containing the resistivity modifiers (a) to (d) used in Examples 34-38 and TBAB used in Comparative Example in respectively indicated addition amounts in Table 10 were respectively injected into the above-prepared blank cell to prepare liquid crystal cells.

The liquid crystal cells were subjected to DC voltage application (20 V) and then subjected to measurement of volume resistivities before and after the DC voltage application.

As a result, the liquid crystal cells containing the resistivity modifiers used in Examples 34-38 respectively showed substantially no change in the volume resistivity even after 30 hours compared with those in Table 10. However, the liquid crystal cell containing TBAB showed increase in the volume resistivity by 20% after 30 hours compared with that in Table 10. The resistivity modifier used in the present invention provided a liquid crystal composition having good stability of the volume resistivity even after a long lapse of time.

As described hereinabove, the liquid crystal composition containing at least one resistivity modifier of the formulas (I)–(IV) according to the present invention can have a stably and durably decreased resistivity of the liquid crystal layer. Since the resistivity modifier is added in a small amount, the resistivity modifier has little or no influence on characteristics such as a viscosity and a phase transition temperature of the liquid crystal composition.

Further, in an FLC panel, the liquid crystal device comprising the liquid crystal composition, and the display method using the composition and the device according to the present invention can provide remarkably improved image qualities such that: bistability of liquid crystal molecules is improved in a liquid crystal cell having an insulating layer; and switching of a display image is smoothly conducted since afterimages of "blurring black" caused by a reverse voltage are attenuated quickly due to a low resistivity when a "black" data signal is changed into a "white" data signal.

According to the present invention, there is further provided a display apparatus utilizing the liquid crystal device of the present invention as a display unit, which shows good display characteristic in combination with a light source, a drive circuit, etc.

What is claimed is:

1. A liquid crystal composition comprising at least one mesomorphic compound and at least one compound represented by the following Formulae (I), (II) and (IV):

<img> Formula (I) </img> wherein R denotes hydrogen, or a linear or branched alkyl group having 1–18 carbon atoms capable of having a substituent; and X denotes —O—, $$-\underset{\underset{O}{\|}}{C}O-\quad \text{or} \quad -O\underset{\underset{O}{\|}}{C}-;$$

<img> Formula (II) </img> wherein $R_1$ denotes a linear or branched alkyl or alkoxy group having 1–18 carbon atoms capable of having a substituent; and $X_1$ denotes —CCO— or —CH$_2$O—; and wherein $R_1$ denotes a linear or branched alkyl or alkoxy group having 1–18 carbon atoms capable of having a substituent; and $X_1$ denotes $$-\underset{\underset{O}{\|}}{C}O-$$

or —CH$_2$O—; and

<img> Formula (IV) </img> wherein $R_3$ denotes a linear or branched alkyl group having 1–18 carbon atoms capable of having a substituent; —A— denotes <img> phenylene or cyclohexylene </img>

$X_3$ denotes —O—

$$-\underset{\underset{O}{\|}}{C}O-,\quad -O\underset{\underset{O}{\|}}{C}-$$

or a single bond, $X_4$ denotes —O—, $$-\underset{\underset{O}{\|}}{C}O-$$

or —CH$_2$O—; and m is 0 or 1, wherein said liquid crystal composition is mesomorphic.

2. A liquid crystal composition according to claim 1, wherein R in the formula (I) is represented by one of the following groups (i) and (ii):
(i) an an-alkyl group having 1–18 carbon atoms; and
(ii)

$$+CH_2\overline{)_p}\underset{\underset{CH_3}{|}}{C}HC_kH_{2k+1},$$

wherein p denotes an integer of 0–7 and k denotes an integer of 1–9.

3. A liquid crystal composition according to claim 1, wherein X denotes —O—.

4. A liquid crystal composition according to claim 1, wherein $R_1$ denotes an n-alkyl group having 1–18 carbon atoms.

5. A liquid crystal composition according to claim 1, wherein $R_1$ denotes an n-alkyl group having 3–14 carbon atoms.

6. A liquid crystal composition according to claim 1, wherein $R_3$ in the formula (IV) is represented by any one of the following groups (i) and (ii):
(i) an n-alkyl group having 1–18 carbon atoms; and
(ii)

$$+CH_2\overline{)_p}\underset{\underset{CH_3}{|}}{C}HC_kH_{2k+1},$$

wherein p denotes an integer of 0–7 and k denotes an integer of 1–9.

7. A liquid crystal composition according to claim 1, wherein $X_4$ denotes —O— or $$-\underset{\underset{O}{\|}}{C}O-$$

when m is 0 and denotes $$-\underset{\underset{O}{\|}}{C}O-$$

when m is 1 in the formula (IV).

8. A liquid crystal composition according to claim 1, wherein $X_3$ denotes a single bond when —A— denotes

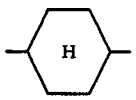

in the formula (IV).

9. A liquid crystal composition according to claim 1, which contains 0.01-5 wt. % of one compound represented by any one of the formulas (I), (II), and (IV).

10. A liquid crystal composition according to claim 1, which contains 0.05-2 wt. % of one compound represented by any one of the formulas (I), (II) and (IV).

11. A liquid crystal composition according to claim 1, which contains 0.2-1 wt. % of one compound represented by any one of the formulas (I)-(IV).

12. A liquid crystal composition according to claim 1, which contains 0.01-10 wt. % of two or more compounds represented by the formulas (I)-(IV).

13. A liquid crystal composition according to claim 1, which contains 0.01-4 wt. % of two or more compounds represented by the formulas (I)-(IV).

14. A liquid crystal composition according to claim 1, which contains 0.2-2 wt. % of two or more compounds represented by the formulas (I)-(IV).

15. A liquid crystal composition according to claim 1, which assumes a chiral smectic phase.

16. A liquid crystal composition according to claim 1, which assumes a nematic phase.

17. A liquid crystal composition according to claim 1, which assumes a cholesteric phase.

18. A liquid crystal composition according to claim 1, which assumes a smectic phase.

19. A liquid crystal device, comprising a pair of electrode plates and a liquid crystal composition according to claim 1 disposed between the electrode plates.

20. A liquid crystal device according to claim 19, which further comprises an insulating alignment control layer.

21. A display apparatus comprising a liquid crystal device according to claim 19, and voltage application means for driving the liquid crystal device.

22. A display apparatus according to claim 21, wherein the liquid crystal device constitutes a display panel wherein the alignment direction of liquid crystal molecules is switched by using voltage application means to effect display.

23. A display apparatus according to claim 21, which further comprises a light source.

24. A liquid crystal composition according to claim 1, wherein said at least one mesomorphic compound is non-reactive with said at least one compound of Formulae (I), (II) and (IV).

25. A display method, comprising the steps of:
providing a liquid crystal device comprising a pair of electrode plates and a liquid crystal composition disposed therebetween comprising: at least one mesomorphic compound and at least one compound represented by the following Formulae (I), (II) and (IV):

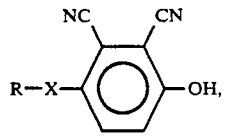

wherein R denotes hydrogen, or a linear or branched alkyl group having 1-18 carbon atoms capable of having a substituent; and X denotes —O—,

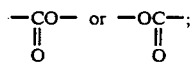

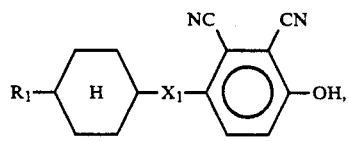

wherein $R_1$ denotes a linear or branched alkyl or alkoxy group having 1-18 carbon atoms capable of having a substituent; and $X_1$ denotes —CO— or —$CH_2O$—; and

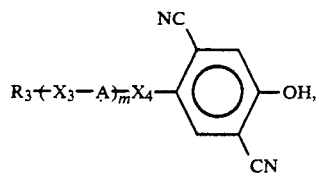

wherein $R_3$ denotes a linear or branched alkyl group having 1-18 carbon atoms capable of having a substituent; —A— denotes

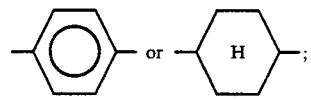

$X_3$ denotes —O—,

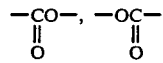

or single bond, $X_4$ denotes —O—,

or —$CH_2O$—; and m is 0 or 1 wherein said liquid crystal compound is mesomorphic; and switching the alignment direction of liquid crystal molecules by using voltage application means to effect display.

26. A display method according to claim 25, wherein R in the formula (I) is represented by any one of the following groups (i) and (ii):
(i) an n-alkyl group having 1-18 carbon atoms; and
(ii)

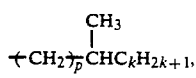

wherein p denotes an integer of 0-7 and k denotes an integer of 1-9.

27. A display method according to claim 25, wherein X denotes —O—.

28. A display method according to claim 25, wherein $R_1$ denotes an n-alkyl group having 1-18 carbon atoms.

29. A display method according to claim 25, wherein $R_1$ denotes an n-alkyl group having 3-14 carbon atoms.

30. A display method according to claim 25, wherein $R_3$ in the formula (IV) is represented by any one of the following groups (i) and (ii):

(i) an n-alkyl group having 1-18 carbon atoms; and (ii)

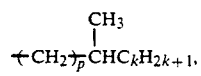

wherein p denotes an integer of 0-7 and k denotes an integer of 1-9.

31. A display method according to claim 25, wherein $X_4$ denotes —O— or

when m is 0 and denotes

when m is 1 in the formula (IV).

32. A display method according to claim 25, wherein $X_3$ denotes a single bond when —A— denotes

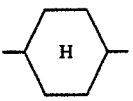

in the formula (IV).

33. A display method according to claim 25, wherein the liquid crystal composition contains 0.01-5 wt. % of one compound represented by any one of the formulas (I), (II) and (IV).

34. A display method according to claim 25, wherein the liquid crystal composition contains 0.05-2 wt. % of one compound represented by any one of the formulas (I)-(IV).

35. A display method according to claim 25, wherein the liquid crystal composition contains 0.2-1 wt. % of one compound represented by any one of the formulas (I)-(IV).

36. A display method according to claim 25, wherein the liquid crystal composition contains 0.01-10 wt. % of two or more compounds represented by the formulas (I)-(IV).

37. A display method according to claim 25, wherein the liquid crystal composition contains 0.01-4 wt. % of two or more compounds represented by the formulas (I)-(IV).

38. A display method according to claim 25, wherein the liquid crystal composition contains 0.2-2 wt. % of two or more compounds represented by the formulas (I)-(IV).

39. A display method according to claim 25, wherein the liquid crystal composition assumes a chiral smectic phase.

40. A display method according to claim 25, wherein the liquid crystal composition assumes a nematic phase.

41. A display method according to claim 25, wherein the liquid crystal composition assumes a cholesteric phase.

42. A display method according to claim 25, wherein the liquid crystal composition assumes a smectic phase.

43. A display method according to claim 25, wherein the liquid crystal device further comprises an insulating alignment control layer.

44. A display method according to claim 25, further including a step of illuminating the liquid crystal device with light.

45. A display method according to claim 25, wherein said at least one mesomorphic compound is non-reactive with said at least one compound of Formulae (I), (II) and (IV).

* * * * *

UNITED STATES PATENT AND TRADEMARK OFFICE
CERTIFICATE OF CORRECTION

PATENT NO. : 5,217,643                                       Page 1 of 5
DATED      : June 8, 1993
INVENTOR(S): AKIO YOSHIDA, ET AL.

It is certified that error appears in the above-identified patent and that said Letters Patent is hereby corrected as shown below:

On title page, item
   [56] REFERENCES CITED

Under FOREIGN PATENT DOCUMENTS:
        "1090413" should read --1-090413--.

COLUMN 2

Line 48, "Form" should read --Forum--.

COLUMN 3

Line 29, "alkocy" should read --alkoxy--.

COLUMN 4

Line 52, "($R_{Lc}$" should read --($R_{Lc}$)--.

COLUMN 5

Line 48, "formula" should read --formulas--.

COLUMN 6

Formula (1-7), "$C_6H_{13}-$" should read --$C_6H_{13}O-$ --.

COLUMN 10

Line 48, "recrystalized" should read --recrystallized--.

UNITED STATES PATENT AND TRADEMARK OFFICE
CERTIFICATE OF CORRECTION

PATENT NO. : 5,217,643

DATED : June 8, 1993

INVENTOR(S) : AKIO YOSHIDA, ET AL.

It is certified that error appears in the above-identified patent and that said Letters Patent is hereby corrected as shown below:

COLUMN 13

Formula (2-30), "$-\underset{\underset{O}{\|}}{C}O-$" should read -- $-CH_2O-$ --.

COLUMN 14

Line 28, "were" should read --was--.

COLUMN 15

Line 23, "$Y_1 = Y\ Y_3 = F$" should read --$Y_1 = Y_3 = F$--.

COLUMN 24

Line 55, "production" should read --Production--.

COLUMN 25

Line 42, "example" should read --examples--.

COLUMN 32

Formula (4-60), "$C_5H_{11}-$" should read --$C_5H_{11}O-$ --.

COLUMN 34

Line 25, "gracial" should read --glacial--.
Line 27, "gracial" should read --glacial--.
Line 51, "as" should read --was--.

UNITED STATES PATENT AND TRADEMARK OFFICE
CERTIFICATE OF CORRECTION

PATENT NO. : 5,217,643           Page 3 of 5
DATED      : June 8, 1993
INVENTOR(S): AKIO YOSHIDA, ET AL.

It is certified that error appears in the above-identified patent and that said Letters Patent is hereby corrected as shown below:

COLUMN 36

Line 10, "position" should read --positive--.
Line 26, "shift resistor 108," should read
         --shift register 108,--.

COLUMN 38

Line 25, "attempted" should read --attenuated--.

COLUMN 39

Line 28, "(1-3 ," should read --(1-3),--.
Line 63, "as" should read --and--.

COLUMN 40

Line 24, "commercial" should read --commercially--.
Line 54, "2-15)," should read --(2-15),--.

COLUMN 41

Line 26, "as" should read --and--.
Line 63, "as" should read --and--.

COLUMN 44

Line 3, "cell" should read --cells--.
Line 42, "cell" should read --cells--.

UNITED STATES PATENT AND TRADEMARK OFFICE
CERTIFICATE OF CORRECTION

PATENT NO. : 5,217,643

DATED : June 8, 1993

INVENTOR(S) : AKIO YOSHIDA, ET AL.

It is certified that error appears in the above-identified patent and that said Letters Patent is hereby corrected as shown below:

COLUMN 45

Lines 43-46, "wherein $R_1$ denotes a linear or branched alkyl or alkoxy group having 1-18 carbon atoms capable of having a substituent; and $X_1$ denotes —CCO— or —$CH_2O$—; and" should be deleted.

COLUMN 46

Line 7, "—O—" should read -- —O—, --.
Line 25, "an-alkyl" should read --n-alkyl--.

COLUMN 47

Line 20, "formulas (I)-(IV)." should read
--formulas (I), (II) and (IV).--.
Line 23, "formulas (I)-(IV)." should read
--formulas (I), (II) and (IV).--.
Line 27, "formulas (I)-(IV)." should read
--formulas (I), (II) and (IV).--.
Line 30, "formulas (I)-(IV)." should read
--formulas (I), (II) and (IV).--.

COLUMN 48

Line 58, "1 wherein" should read --1, wherein--.

COLUMN 50

Line 15, "(I)-(IV)." should read --(I), (II) and (IV).--.
Line 19, "(I)-(IV)." should read --(I), (II) and (IV).--.
Line 23, "(I)-(IV)." should read --(I), (II) and (IV).--.

UNITED STATES PATENT AND TRADEMARK OFFICE
CERTIFICATE OF CORRECTION

PATENT NO.  : 5,217,643

DATED       : June 8, 1993

INVENTOR(S) : AKIO YOSHIDA, ET AL.

It is certified that error appears in the above-identified patent and that said Letters Patent is hereby corrected as shown below:

COLUMN 50

Line 27, "(I)-(IV)." should read --(I), (II) and (IV).--.
    Line 31, "(I)-(IV)." should read --(I), (II) and (IV).--.

Signed and Sealed this

Third Day of May, 1994

BRUCE LEHMAN

Attest:

Attesting Officer

Commissioner of Patents and Trademarks